(12) United States Patent
Miyoshi et al.

(10) Patent No.: US 10,876,870 B2
(45) Date of Patent: *Dec. 29, 2020

(54) METHOD OF DETERMINING FLOW RATE OF A GAS IN A SUBSTRATE PROCESSING SYSTEM

(71) Applicant: TOKYO ELECTRON LIMITED, Tokyo (JP)

(72) Inventors: Risako Miyoshi, Miyagi (JP); Norihiko Amikura, Miyagi (JP); Kazuyuki Miura, Miyagi (JP); Masaaki Nagase, Osaka (JP); Satoru Yamashita, Osaka (JP); Yohei Sawada, Osaka (JP); Kouji Nishino, Osaka (JP); Nobukazu Ikeda, Osaka (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 77 days.

This patent is subject to a terminal disclaimer.

(21) Appl. No.: 16/238,834

(22) Filed: Jan. 3, 2019

(65) Prior Publication Data

US 2019/0212176 A1 Jul. 11, 2019

(30) Foreign Application Priority Data

Jan. 9, 2018 (JP) ................................. 2018-001420

(51) Int. Cl.
*G01F 1/50* (2006.01)
*G01F 25/00* (2006.01)
*G01F 3/36* (2006.01)

(52) U.S. Cl.
CPC .................. *G01F 1/50* (2013.01); *G01F 3/36* (2013.01); *G01F 25/0053* (2013.01)

(58) Field of Classification Search
None
See application file for complete search history.

(56) References Cited

U.S. PATENT DOCUMENTS

| 2018/0299908 | A1* | 10/2018 | Amikura | ........... H01L 21/67109 |
| 2019/0063987 | A1* | 2/2019 | Hirose | .................... G01F 3/226 |
| 2019/0301912 | A1* | 10/2019 | Miyoshi | ................ G01F 15/002 |

FOREIGN PATENT DOCUMENTS

JP 2012-032983 A 2/2012

* cited by examiner

*Primary Examiner* — Harshad R Patel
(74) *Attorney, Agent, or Firm* — Studebaker & Brackett PC

(57) ABSTRACT

A substrate processing system includes a gas supply unit having a first gas flow channel. A second gas flow channel of a flow rate measurement system is connected to the first gas flow channel. The flow rate measurement system further includes a third gas flow channel connected to the second gas flow channel, and a pressure sensor and a temperature sensor that measure a pressure and a temperature, respectively, in the third gas flow channel. In a method, a flow rate of a gas output from a flow rate controller of the gas supply unit is calculated using a build-up method. The flow rate of a gas is calculated without using the total volume of the first gas flow channel and the second gas flow channel and temperatures in the first gas flow channel and the second gas flow channel.

9 Claims, 6 Drawing Sheets

METHOD OF DETERMINING FLOW RATE OF A GAS IN A SUBSTRATE PROCESSING SYSTEM

CROSS-REFERENCE TO RELATED APPLICATIONS

This application is based on and claims the benefit of priority from Japanese Patent Application No. 2018-001420 filed on Jan. 9, 2018, the entire contents of which are incorporated herein by reference.

TECHNICAL FIELD

Exemplary embodiments of the present disclosure relate to a method of determining a flow rate of a gas in a substrate processing system.

BACKGROUND

In substrate processing, a substrate is disposed in an internal space of a chamber body, a gas is supplied to the internal space, and the substrate is processed by the supplied gas. In substrate processing, a flow rate of a gas supplied to the internal space of the chamber body is controlled by a flow rate controller. The accuracy of control of the flow rate of a gas influences a result of substrate processing. Therefore, the flow rate of a gas which is output by the flow rate controller is measured.

As one of methods of measuring a flow rate of a gas, a build-up method is used. The build-up method is disclosed in Japanese Patent Application Laid-Open Publication No. 2012-32983. In the build-up method disclosed in Japanese Patent Application Laid-Open Publication No. 2012-32983, a volume of a gas flow channel is determined in advance. A flow rate is determined from a rise rate for pressure within the gas flow channel, a temperature within the gas flow channel, and the determined volume.

SUMMARY

In one aspect, there is provided a method of determining a flow rate of a gas in a substrate processing system using a flow rate measurement system. The substrate processing system includes a plurality of chamber bodies, a plurality of gas supply units, and a plurality of exhaust apparatuses. Each of the plurality of gas supply units is configured to supply a gas to an internal space of a corresponding chamber body among the plurality of chamber bodies. Each of the plurality of gas supply units has a housing, a plurality of flow rate controllers, a plurality of primary valves, a plurality of secondary valves, and a first gas flow channel. The plurality of flow rate controllers are provided within the housing. The plurality of primary valves are connected to primary sides of the plurality of flow rate controllers, respectively. The plurality of secondary valves are connected to secondary sides of the plurality of flow rate controllers, respectively. The first gas flow channel includes a plurality of first ends, a second end, and a third end. The plurality of first ends are connected to the plurality of secondary valves, respectively. The plurality of first ends, the second end, and a portion extending from the plurality of first ends to the second end are provided within the housing. The third end is provided outside the housing. The third end is connected to the internal space of the corresponding chamber body through an on/off valve. The plurality of exhaust apparatuses are connected to internal spaces of the plurality of chamber bodies through a plurality of exhaust flow channels, respectively.

The flow rate measurement system includes a second gas flow channel, a third gas flow channel, a first valve, a second valve, one or more first pressure sensors, and a first temperature sensor. The second gas flow channel includes a plurality of fourth ends and a fifth end. Each of the plurality of fourth ends is connected to the second end of a corresponding gas supply unit among the plurality of gas supply units. The third gas flow channel has a sixth end and a seventh end. The first valve is connected between the fifth end of the second gas flow channel and the sixth end of the third gas flow channel. The second valve is connected to the seventh end of the third gas flow channel, and is provided to be capable of being connected to the plurality of exhaust apparatuses. The one or more first pressure sensors are configured to measure a pressure within the third gas flow channel. The first temperature sensor is configured to measure a temperature within the third gas flow channel.

The method according to the one aspect includes:

(i) evacuating the first gas flow channel, the second gas flow channel, and the third gas flow channel of one gas supply unit among the plurality of gas supply units;

(ii) acquiring a measured value $P_{11}$ of a pressure within the third gas flow channel using the one or more first pressure sensors, in a first state where a gas output from one flow rate controller among the plurality of flow rate controllers of the one gas supply unit is confined between the second valve and one secondary valve connected to a secondary side of the one flow rate controller among the plurality of secondary valves of the one gas supply unit, after the evacuating;

(iii) raising a pressures in the first gas flow channel, the second gas flow channel, and the third gas flow channel by forming a second state where a gas is supplied from the one flow rate controller to the first gas flow channel, the second gas flow channel, and the third gas flow channel, and the second valve is closed, after the acquiring a measured value $P_{11}$;

(iv) forming a third state where the second valve and the one secondary valve are closed, after the raising a pressures;

(v) acquiring a measured value $P_{12}$ of a pressure within the third gas flow channel and a measured value $T_{12}$ of a temperature within the third gas flow channel in the third state, using the one or more first pressure sensors and the first temperature sensor;

(vi) forming a fourth state where the second valve is opened and the first valve is closed, from the third state;

(vii) forming a fifth state where the second valve is closed, from the fourth state;

(viii) acquiring a measured value $P_{13}$ of a pressure within the third gas flow channel in the fifth state, using the one or more first pressure sensors;

(ix) forming a sixth state where the first valve is opened from the fifth state;

(x) acquiring a measured value $P_{14}$ of a pressure within the third gas flow channel in the sixth state, using the one or more first pressure sensors; and (xi) determining a flow rate Q of the gas output from the one flow rate controller in the second state by executing an arithmetic operation of the following Expression (1).

$$Q=(P_{12}-P_{11})/\Delta t \times (1/R) \times (V/T) \quad (1)$$

In Expression (1), $\Delta t$ is a time length of an execution period of the raising a pressure, R is a gas constant, (V/T) includes $\{V_3/T_{12} \times (P_{12}-P_{13})/(P_{12}-P_{14})\}$, and $V_3$ is a default value of a volume of the third gas flow channel.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

DETAILED DESCRIPTION

Figure 1:
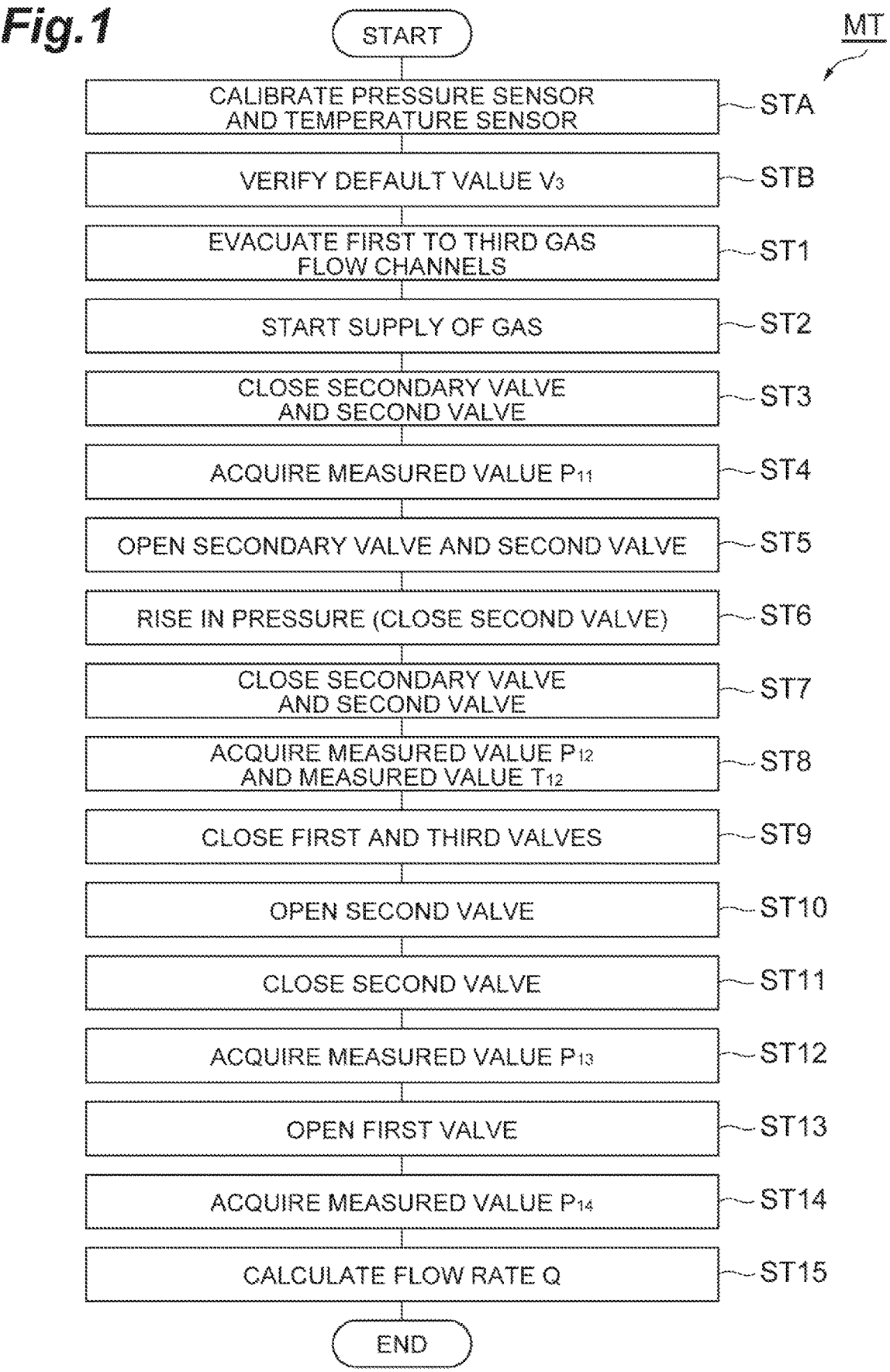
FIG. 1 is a flow diagram illustrating a method of determining a flow rate of a gas according to an exemplary embodiment.

In the following detailed description, reference is made to the accompanying drawings, which form a part hereof. The exemplary embodiments described in the detailed description, drawing, and claims are not meant to be limiting. Other exemplary embodiments may be utilized, and other changes may be made, without departing from the spirit or scope of the subject matter presented here.

In a case where a temperature within the gas flow channel when the volume is determined and a temperature within the gas flow channel when other parameters required for the calculation of a flow rate are acquired are different from each other, it is not possible to accurately determine a flow rate of a gas by the build-up method. Therefore, there is a need for a method of determining a flow rate of a gas with a high degree of accuracy.

In one aspect, there is provided a method of determining a flow rate of a gas in a substrate processing system using a flow rate measurement system. The substrate processing system includes a plurality of chamber bodies, a plurality of gas supply units, and a plurality of exhaust apparatuses. Each of the plurality of gas supply units is configured to supply a gas to an internal space of a corresponding chamber body among the plurality of chamber bodies. Each of the plurality of gas supply units has a housing, a plurality of flow rate controllers, a plurality of primary valves, a plurality of secondary valves, and a first gas flow channel. The plurality of flow rate controllers are provided within the housing. The plurality of primary valves are connected to primary sides of the plurality of flow rate controllers, respectively. The plurality of secondary valves are connected to secondary sides of the plurality of flow rate controllers, respectively. The first gas flow channel includes a plurality of first ends, a second end, and a third end. The plurality of first ends are connected to the plurality of secondary valves, respectively. The plurality of first ends, the second end, and a portion extending from the plurality of first ends to the second end are provided within the housing. The third end is provided outside the housing. The third end is connected to the internal space of the corresponding chamber body through a on/off valve. The plurality of exhaust apparatuses are connected to internal spaces of the plurality of chamber bodies through a plurality of exhaust flow channels, respectively.

The flow rate measurement system includes a second gas flow channel, a third gas flow channel, a first valve, a second valve, one or more first pressure sensors, and a first temperature sensor. The second gas flow channel includes a plurality of fourth ends and a fifth end. Each of the plurality of fourth ends is connected to the second end of a corresponding gas supply unit among the plurality of gas supply units. The third gas flow channel has a sixth end and a seventh end. The first valve is connected between the fifth end of the second gas flow channel and the sixth end of the third gas flow channel. The second valve is connected to the seventh end of the third gas flow channel, and is provided to be capable of being connected to the plurality of exhaust apparatuses. The one or more first pressure sensors are configured to measure a pressure within the third gas flow channel. The first temperature sensor is configured to measure a temperature within the third gas flow channel.

The method according to the one aspect includes:

(i) evacuating the first gas flow channel, the second gas flow channel, and the third gas flow channel of one gas supply unit among the plurality of gas supply units;

(ii) acquiring a measured value $P_{11}$ of a pressure within the third gas flow channel using the one or more first pressure sensors, in a first state where a gas output from one flow rate controller among the plurality of flow rate controllers of the one gas supply unit is confined between the second valve and one secondary valve connected to a secondary side of the one flow rate controller among the plurality of secondary valves of the one gas supply unit, after the evacuating;

(iii) raising a pressures in the first gas flow channel, the second gas flow channel, and the third gas flow channel by forming a second state where a gas is supplied from the one flow rate controller to the first gas flow channel, the second gas flow channel, and the third gas flow channel, and the second valve is closed, after the acquiring a measured value $P_{11}$;

(iv) forming a third state where the second valve and the one secondary valve are closed, after the raising a pressures;

(v) acquiring a measured value $P_{12}$ of a pressure within the third gas flow channel and a measured value $T_{12}$ of a temperature within the third gas flow channel in the third state, using the one or more first pressure sensors and the first temperature sensor;

(vi) forming a fourth state where the second valve is opened and the first valve is closed, from the third state;

(vii) forming a fifth state where the second valve is closed, from the fourth state;

(viii) acquiring a measured value $P_{13}$ of a pressure within the third gas flow channel in the fifth state, using the one or more first pressure sensors;

(ix) forming a sixth state where the first valve is opened from the fifth state;

(x) acquiring a measured value $P_{14}$ of a pressure within the third gas flow channel in the sixth state, using the one or more first pressure sensors; and (xi) determining a flow rate Q of the gas output from the one flow rate controller in the second state by executing an arithmetic operation of the following Expression (1).

$$Q=(P_{12}-P_{11})/\Delta t \times (1/R) \times (V/T) \qquad (1)$$

In Expression (1), $\Delta t$ is a time length of an execution period of the raising a pressure, R is a gas constant, (V/T) includes $\{V_3/T_{12} \times (P_{12}-P_{13})/(P_{12}-P_{14})\}$, and $V_3$ is a default value of a volume of the third gas flow channel.

In the method according to the one aspect, a pressure rise is caused by supplying a gas from the one flow rate controller to the first gas flow channel, the second gas flow channel, and the third gas flow channel of the one gas supply unit in a state where the second valve is closed. The rate of this pressure rise, that is, the rate of rise in pressure is used in Expression (1), so that a flow rate of a gas output from the one flow rate controller is determined. In Expression (1), V/T should include a sum of $(V_E/T_E)$ and $(V_3/T_{12})$. Here, $V_E$ is a sum of the volume of the first gas flow channel and the volume of the second gas flow channel, and $T_E$ is a temperature in the first gas flow channel and the second gas flow channel in the third state. Since the first gas flow channel is disposed within the housing, a temperature within the first gas flow channel is less influenced by the surrounding environment. In addition, since the third gas flow channel is connected to the first gas flow channel through the second gas flow channel, a temperature in the third gas flow channel is less influenced by the plurality of chamber bodies. On the other hand, the second gas flow channel may be influenced the surrounding environment, for example, the temperature of any of the plurality of chamber bodies. In the method according to the one aspect, $V_3/T_{12} \times (P_{12}-P_{13})/(P_{12}-P_{14})$ is used in Expression (1) instead of the sum of $(V_E/T_E)$ and $(V_3/T_{12})$. That is, in the calculation of a flow rate, it is possible to use a measured value acquired from a location which is not likely influenced by a temperature from the surrounding environment. Therefore, according to the method of the one aspect, it is possible to determine a flow rate with a high degree of accuracy. In addition, in the method according to an aspect, a sixth state is formed by diffusing a gas confined in the first gas flow channel and the second gas flow channel in the third state to the third gas flow channel, and thus the measured value $P_{14}$ is acquired in the sixth state. That is, a gas used for forming a state during the acquisition of the measured value $P_{12}$ is reused for forming a state during the acquisition of the measured value $P_{14}$. Therefore, it is possible to efficiently determine a flow rate.

In an embodiment, the pressure within the third gas flow channel in the fifth state is set to be higher than the pressure within the third gas flow channel which is evacuated. In this embodiment, the fifth state is formed by a gas contained within the third gas flow channel in the third state being partially discharged, that is, without being completely discharged. Therefore, a time length required for forming the fifth state from the second state is shortened.

In an embodiment, a flow rate measurement system further includes a fourth gas flow channel, a third valve, and a fourth valve. The fourth gas flow channel has an eighth end, a ninth end, a tenth end, a first partial flow channel extending between the eighth end and the ninth end, and a second partial flow channel branching from the first partial flow channel to extend to the tenth end. The second valve is connected between the seventh end of the third gas flow channel and the eighth end of the fourth gas flow channel. The third valve is connected between the ninth end of the fourth gas flow channel and each of the plurality of exhaust apparatuses. The fourth valve is provided on the second partial flow channel. In this embodiment, the method further includes:

connecting a tank of a reference device to the tenth end, the reference device having the tank, a second temperature sensor that measures a temperature in an internal space of the tank, a second pressure sensor that measures a pressure in the internal space of the tank, and a fifth valve connected between the fourth valve and the internal space of the tank;

acquiring a measured value $P_{r1}$ of the pressure in the internal space of the tank and a measured value $T_{r1}$ of the temperature in the internal space of the tank using the second pressure sensor and the second temperature sensor, respectively, in a state where a gas is confined in the internal space of the tank;

acquiring a measured value $P_{r2}$ of the pressure in the internal space of the tank and a measured value $T_{r2}$ of the temperature in the internal space of the tank using the second pressure sensor and the second temperature sensor, respectively, in a state where the gas confined in the internal space of the tank is diffused in the internal space of the tank and the fourth gas flow channel;

determining a calculated value $V_4$ of a volume of the fourth gas flow channel by executing an arithmetic operation of the following Expression (2) using an already-known volume $V_r$ of the internal space of the tank, the measured value $P_{r1}$, the measured value $T_{r1}$, the measured value $P_{r2}$, and the measured value $T_{r2}$;

$$V_4 = V_r \times (P_{r1}/T_{r1} - P_{r2}/T_{r2}) \times T_{r2}/P_{r2} \qquad (2)$$

acquiring a measured value $T_{1f}$ of a temperature within the third gas flow channel, a measured value $P_{r3}$ of a pressure of the internal space of the tank, and a measured value $T_{r3}$ of a temperature of the internal space of the tank using the first temperature sensor, the second pressure sensor, and the second temperature sensor, respectively, in a state where the gas diffused in the internal space of the tank and the fourth gas flow channel is diffused in the internal space of the tank, the third gas flow channel, and the fourth gas flow channel;

determining a calculated value $V_{3C}$ of a volume of the third gas flow channel by executing an arithmetic operation of the following Expression (3) using the already-known volume $V_r$ of the internal space of the tank, the measured value $P_{r1}$, the measured value $T_{r1}$, the calculated value $V_4$, the measured value $P_{r3}$, the measured value $T_{r3}$, and the measured value $T_{1f}$; and $$V_{3C} = (V_r \times P_{r1}/T_{r1} - V_4 \times P_{r3}/T_{r3} - V_r \times P_{r3}/T_{r3}) \times T_{1f}/P_{r3} \qquad (3)$$

comparing the calculated value $V_{3C}$ with the default value $V_3$.

In this embodiment, the calculated value $V_{3C}$ of the volume of the third gas flow channel is acquired on the basis of the Boyle-Charles' law. The calculated value $V_{3C}$ and the default value $V_3$ are compared with each other, and thus the reliability of the default value $V_3$ is verified.

In an embodiment, the method further includes:

acquiring a plurality of calculated values $V_{3C}$ of a volume of the third gas flow channel by repeating the acquiring a measured value $P_{r1}$ of the pressure in the internal space of the tank and a measured value $T_{r1}$ of the temperature in the internal space of the tank, the acquiring a measured value $P_{r2}$ of the pressure in the internal space of the tank and a measured value $T_{r2}$ of the temperature in the internal space of the tank, the determining a calculated value $V_4$ of a volume of the fourth gas flow channel, the acquiring a measured value $T_{1f}$ of a temperature within the third gas flow channel, a measured value $P_{r3}$ of a pressure of the internal space of the tank, and a measured value $T_{r3}$ of a temperature of the internal space of the tank, and the determining a calculated value $V_{3C}$ of a volume of the third gas flow channel, in a case where an absolute value of a difference between the calculated value $V_{3C}$ and the default value $V_3$ is not included in a predetermined allowable range; and updating the default value $V_3$ using an average value of the plurality of calculated values $V_{3C}$.

According to this embodiment, since the default value $V_3$ is updated by an average value of the plurality of calculated values $V_{3C}$, the default value $V_3$ having high reliability is obtained. Accordingly, the accuracy of calculation of a flow rate based on Expression (1) is further improved.

In an embodiment, the method further includes:

connecting a reference pressure sensor to the tank;

adjusting a zero point of each measured value of the one or more first pressure sensors, the second pressure sensor, and the reference pressure sensor, in a state where the third gas flow channel, the fourth gas flow channel, and the internal space of the tank are evacuated; and acquiring a measured value group including a measured value of each of the one or more first pressure sensors, a measured value of the second pressure sensor, and a measured value of the reference pressure sensor in a state where a gas is confined in the third gas flow channel, the fourth gas flow channel, and the internal space of the tank which communicate with each other so that a pressure in the third gas flow channel, a pressure in the fourth gas flow channel, and a pressure in the internal space of the tank are the same as each other.

The acquiring a measured value group is executed at each of a plurality of cycles. At a k-th cycle among the plurality of cycles, the gas confined in the fourth gas flow channel at a (k−1)-th cycle among the plurality of cycles is discharged, and the gas confined in the third gas flow channel and the internal space of the tank at the (k−1)-th cycle is diffused into the fourth gas flow channel, whereby the state in which the gas is confined in the third gas flow channel, the fourth gas flow channel, and the internal space of the tank is formed. Here, k is an integer equal to or greater than 2. In addition, the method further includes calibrating a pressure sensor identified from each of the plurality of measured value groups as one which acquires a measured value having an error which is not included in a predetermined allowable range with respect to the measured value of the reference pressure sensor, among the one or more first pressure sensors and the second pressure sensor. According to this embodiment, one or more first pressure sensors and the second pressure sensor are appropriately calibrated. As a result, the accuracy of calculation of a flow rate based on Expression (1) is further improved.

Hereinafter, various embodiments will be described in detail with reference to the accompanying drawings. In the drawings, the same or equivalent portions are denoted by the same reference symbols.

Figure 2:
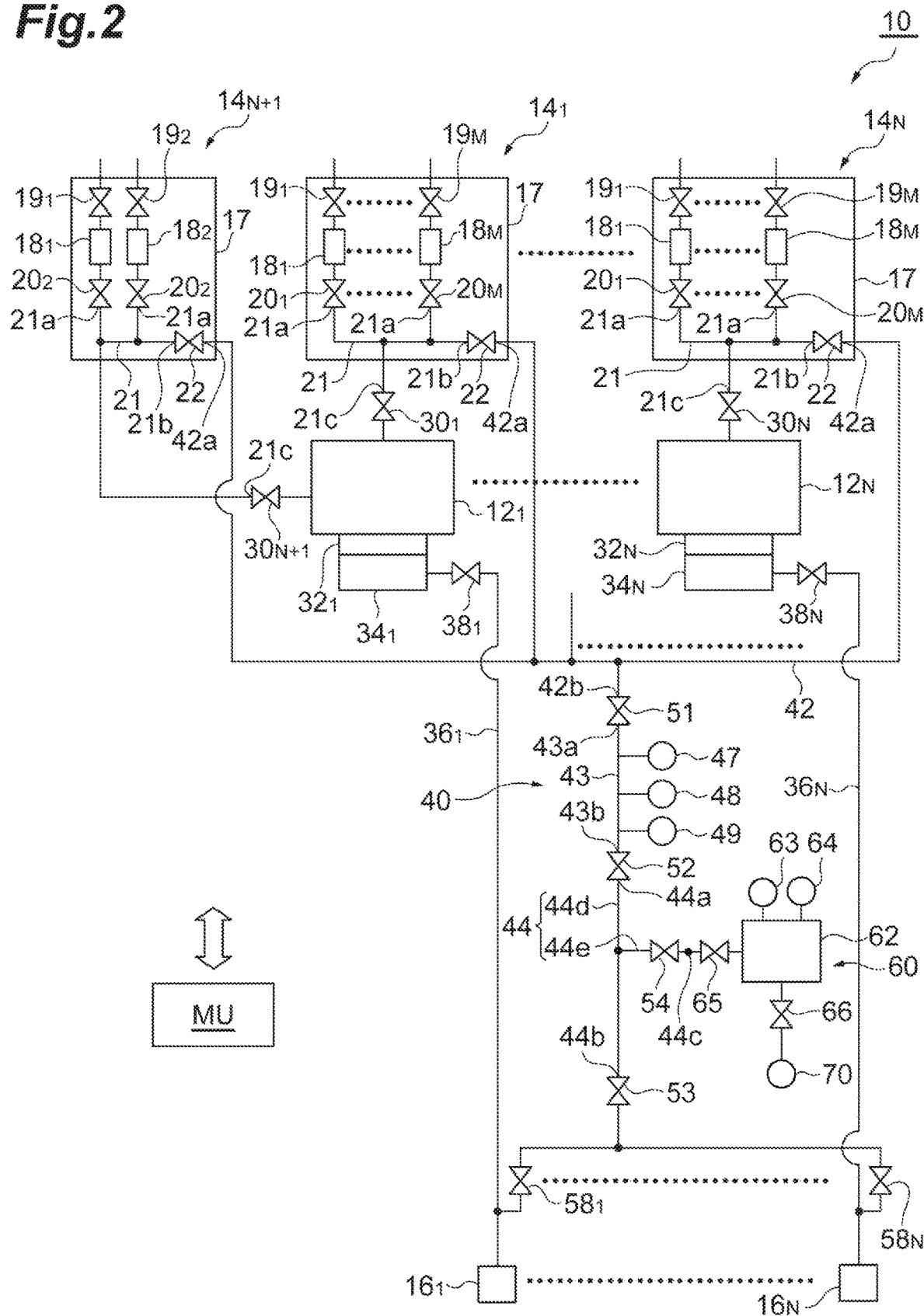
FIG. 2 schematically illustrates a substrate processing system according to an exemplary embodiment.

FIG. 1 is a flow diagram illustrating a method of determining a flow rate of a gas according to an exemplary embodiment. A method MT shown in FIG. 1 is executed using a flow rate measurement system in order to determine a flow rate of a gas in a substrate processing system. FIG. 2 schematically illustrates a substrate processing system according to an exemplary embodiment. The method MT can be applied to a substrate processing system 10 shown in FIG. 2.

The substrate processing system 10 include a plurality of chamber bodies 12, a plurality of gas supply units 14, and, a plurality of exhaust apparatuses 16. In the substrate processing system 10, each of the number of chamber bodies 12 and the number of exhaust apparatuses 16 is N. In addition, in the substrate processing system 10, the number of gas supply units 14 is (N+1). "N" is an integer equal to or greater than 2. In the following description and the drawings, in a case where one element among N or (N+1) elements of the substrate processing system 10 is referred to, the subscript of "i" is added to the end of a reference symbol indicating the element. For example, in a case where one chamber body among the plurality of chamber bodies 12 is referred to, a reference symbol of "$12_i$" is used. Here, i is an integer equal to or greater than 1. The substrate processing system 10 includes a plurality of process modules. Each of a plurality of process modules includes a chamber body $12_i$, a gas supply unit $14_i$, and, an exhaust apparatus $16_i$ which have the same number i.

A substrate is accommodated in the internal space of each of the plurality of chamber bodies 12 for substrate processing. Each of the plurality of gas supply units 14 is configured to supply a gas to the internal space of a corresponding chamber body among the plurality of chamber bodies 12. Specifically, in the substrate processing system 10, the gas supply units $14_1$ to $14_N$ are configured to supply a gas into the chamber bodies $12_1$ to $12_N$, respectively. In addition, the gas supply unit $14_{N+1}$ is configured to supply a gas into the chamber body $12_1$. It should be noted that the gas supply unit $14_{N+1}$ may also be configured to supply a gas to the internal space of the chamber body other than the chamber body $12_1$ among the plurality of chamber bodies 12.

Each of the plurality of gas supply units 14 includes a housing 17, a plurality of flow rate controllers 18, a plurality of primary valves 19, a plurality of secondary valves 20, and a first gas flow channel 21. Each of the plurality of gas supply units 14 may further include a valve 22. In the substrate processing system 10, each of N gas supply units $14_1$ to $14_N$ includes M flow rate controllers 18, M primary valves 19, and M secondary valves 20. M is an integer equal to or greater than 2. In addition, the gas supply unit $14_{N+1}$ includes two flow rate controllers 18, two primary valves 19, and two secondary valves 20. In the following description and the drawings, in a case where one element among a plurality of elements of each of the plurality of gas supply units 14 is referred to, the subscript of "j" is added to the end of a reference symbol indicating the element. For example, in a case where one flow rate controller among the plurality of flow rate controllers 18 is referred to, the reference symbols of "$18_j$" is used. Here, j is an integer equal to or greater than 1.

Figure 3:
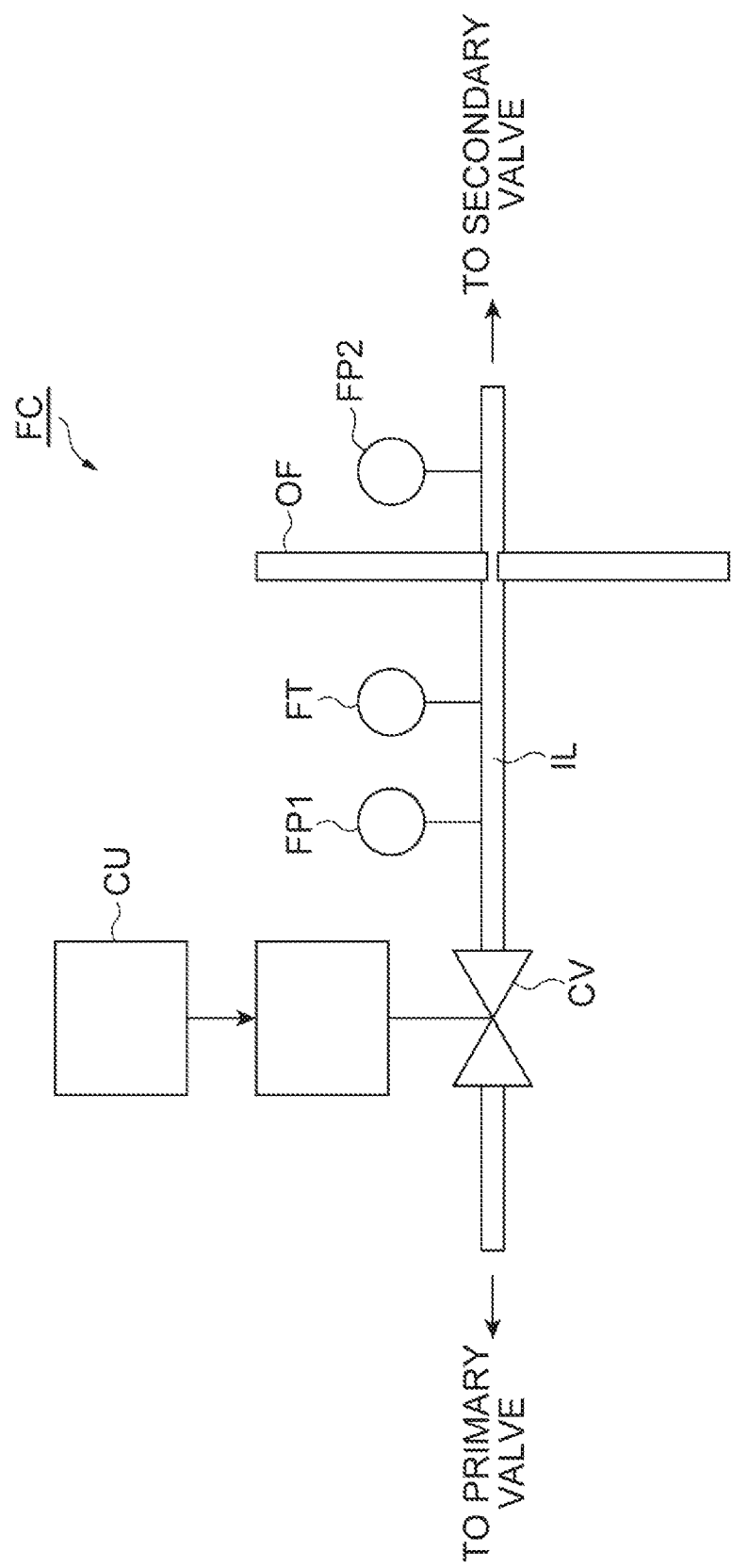
FIG. 3 illustrates a structure of a pressure control-type flow rate controller of an example.

The housing 17 is a container providing an internal space. The plurality of flow rate controllers 18 are accommodated within the housing 17. Among the plurality of flow rate controllers 18 of the plurality of gas supply units 14, a flow rate controller other than the flow rate controller $18_1$ of the gas supply unit $14_{N+1}$ is a mass flow controller or a pressure control-type flow rate controller. FIG. 3 illustrates a structure of a pressure control-type flow rate controller of an example. A flow rate controller FC shown in FIG. 3 may be used as a flow rate controller other than the flow rate controller $18_1$ of the gas supply unit $14_{N+1}$ among the plurality of flow rate controllers 18 of the plurality of gas supply units 14.

The flow rate controller FC includes a control valve CV, a flow channel IL, an orifice member OF, a pressure sensor FP1, a temperature sensor FT, and a pressure sensor FP2. One end of the flow channel IL is connected to the primary valve. The other end of the flow channel IL is connected to the secondary valve. The orifice member OF partially reduces the cross-sectional area of the flow channel IL between one end and the other end of the flow channel IL. At the upstream side of the orifice member OF, the control valve CV is provided on the flow channel IL. The pressure sensor FP1 is configured to measure a pressure within the flow channel IL between the control valve CV and the orifice member OF, that is, on the primary side of the orifice member OF. The temperature sensor FT is configured to measure a temperature within the flow channel IL between the control valve CV and the orifice member OF, that is, on the primary side of the orifice member OF. In addition, the pressure sensor FP2 is configured to measure a pressure within the flow channel IL between the orifice member OF and the other end of the flow channel IL.

In the flow rate controller FC, in a case where the pressure on the primary side (upstream side) of the orifice member OF is two or more times the pressure of the flow channel IL on the downstream side (secondary side) of the orifice member OF, the degree of opening of the control valve CV is controlled by a control unit CU so as to reduce a difference between a set flow rate and a flow rate which is determined from the measured value of a pressure acquired by the pressure sensor FP1. On the other hand, in a case where the pressure on the primary side (upstream side) of the orifice member OF is smaller than two times the pressure of the flow channel IL on the downstream side (secondary side) of the orifice member OF, the degree of opening of the control valve CV is controlled by the control unit CU so as to reduce a difference between a set flow rate and a flow rate which is determined from a difference between the measured value of a pressure acquired by the pressure sensor FP1 and the measured value of a pressure acquired by the pressure sensor FP2. The flow rate controller FC may not include the pressure sensor FP2 in a case of being used in a state where the pressure on the primary side (upstream side) of the orifice member OF is two or more times the pressure of the flow channel IL on the downstream side (secondary side) of the orifice member OF.

Reference is made to FIG. 2 again. As described above, among the plurality of flow rate controllers 18 of the plurality of gas supply units 14, a flow rate controller other than the flow rate controller $18_1$ of the gas supply unit $14_{N+1}$ may be a mass flow controller. The mass flow controller has a temperature sensor similarly to a pressure control-type flow rate controller. The flow rate controller $18_1$ of the gas supply unit $14_{N+1}$ is a mass flow controller, and may have a function of vaporizing a liquid.

The plurality of primary valves 19 are connected to the primary sides of the plurality of flow rate controllers 18, respectively. The plurality of primary valves 19 are provided within the housing 17. A primary valve other than the primary valve $19_1$ of the gas supply unit $14_{N+1}$ among the plurality of primary valves 19 is connected to a corresponding gas source provided on the primary side (upstream side) thereof. The primary valve $19_1$ of the gas supply unit $14_{N+1}$ is connected to a liquid source provided on the primary side thereof. The plurality of secondary valves 20 are connected to the secondary sides of the plurality of flow rate controllers 18, respectively. The plurality of secondary valves 20 are provided within the housing 17.

The first gas flow channel 21 includes a plurality of first ends 21a, a second end 21b, and a third end 21c. The plurality of first ends 21a are connected to the plurality of secondary valves 20, respectively. That is, the plurality of first ends 21a are connected to the secondary sides of the plurality of flow rate controllers 18, respectively, through the plurality of secondary valves 20. The first gas flow channel 21 includes a plurality of flow channels extending from the plurality of first ends 21a, and the plurality of flow channels are connected to a common flow channel. One end of the common flow channel of the first gas flow channel 21 is the second end 21b. A portion of the first gas flow channel 21 extending from the plurality of first ends 21a to the second end 21b is provided within the housing 17. The third end 21c is provided outside the housing 17. A flow channel including the third end 21c is connected to the common flow channel of the first gas flow channel 21. The third end 21c is connected to the internal space of a corresponding chamber body among the plurality of chamber bodies 12 through a corresponding on/off valve 30 ($30_i$). The valve 22 is connected to the second end 21b. The valve 22 is provided within the housing 17.

The substrate processing system 10 includes a plurality of pressure control valves 32, a plurality of turbo-molecular pumps 34, a plurality of exhaust flow channels 36, and, a plurality of valves 38. Each of the plurality of pressure control valves 32 is, for example, an automatic pressure control valve. A pressure control valve $32_i$ is configured to adjust the pressure of the internal space of a corresponding chamber body $12_i$. An exhaust flow channel $36_i$ is connected to the internal space of a corresponding chamber body $12_i$ through a pressure control valve $32_i$ and a turbo-molecular pump $34_i$. A valve $38_i$ is provided on the exhaust flow channel $36_i$. At the downstream side of the valve $38_i$, the exhaust apparatus $16_i$ is connected to the exhaust flow channel $36_i$. Each of the plurality of exhaust apparatuses 16 may be, for example, a dry pump.

As shown in FIG. 2, a flow rate measurement system 40 is connected to the substrate processing system 10 in order to measure a flow rate of a gas which is output by each of the plurality of flow rate controllers 18. The flow rate measurement system 40 is provided with a gas flow channel and various sensors which are used in the measurement of a flow rate of a gas according to a build-up method. Specifically, the flow rate measurement system 40 includes a second gas flow channel 42, a third gas flow channel 43, a pressure sensor 47, a pressure sensor 48, a temperature sensor 49, a first valve 51, and a second valve 52.

The second gas flow channel 42 includes a plurality of fourth ends 42a and a fifth end 42b, and extends from the plurality of fourth ends 42a to the fifth end 42b. Each of the plurality of fourth ends 42a is connected to the second end 21b of the first gas flow channel 21 of a corresponding gas supply unit among the plurality of gas supply units 14. In an embodiment, each of the plurality of fourth ends 42a is connected to the valve 22 of a corresponding gas supply unit among the plurality of gas supply units 14. The second gas flow channel 42 includes a plurality of flow channels including the plurality of fourth ends 42a, respectively, and a common flow channel to which the plurality of flow channels are connected. The common flow channel of the second gas flow channel 42 includes the fifth end 42b.

The third gas flow channel 43 includes a sixth end 43a and a seventh end 43b, and extends from the sixth end 43a to the seventh end 43b. The first valve 51 is connected between the fifth end 42b of the second gas flow channel 42 and the sixth end 43a of the third gas flow channel 43. The second valve 52 is connected to the seventh end 43b of the third gas flow channel 43, and is provided so as to be capable of being connected to the plurality of exhaust apparatuses 16. Each of the pressure sensor 47 and the pressure sensor 48 is configured to measure a pressure within the third gas flow channel 43. The temperature sensor 49 (first temperature sensor) is configured to measure a temperature within the third gas flow channel 43. It should be noted that the flow rate measurement system 40 may have at least one of the pressure sensor 47 and the pressure sensor 48. That is, the flow rate measurement system 40 may have one or more pressure sensors (one or more first pressure sensors) that measure a pressure within the third gas flow channel 43.

In an embodiment, the flow rate measurement system 40 may further include a fourth gas flow channel 44, a third valve 53, and a fourth valve 54. The fourth gas flow channel 44 has an eighth end 44a, a ninth end 44b, and a tenth end 44c. In addition, the fourth gas flow channel 44 has a first partial flow channel 44d and a second partial flow channel 44e. The first partial flow channel 44d extends between the eighth end 44a and the ninth end 44b. The second partial flow channel 44e is branched from the first partial flow channel 44d to extend to the tenth end 44c. The above-described second valve 52 is connected between the seventh end 43b of the third gas flow channel 43 and the eighth end 44a of the fourth gas flow channel 44. The third valve 53 is connected between the ninth end 44b of the fourth gas flow channel 44 and each of the plurality of exhaust apparatuses 16. In an embodiment, N valves 58 are connected to the plurality of exhaust flow channels 36, respectively. The third valve 53 is connected to the exhaust apparatus 16, through the valve 58, and the exhaust flow channel $36_i$. The fourth valve 54 is provided on the second partial flow channel 44e.

In the method MT to be described later, a reference device 60 and a reference pressure sensor 70 are used. The reference device 60 includes a tank 62, a pressure sensor 63 (second pressure sensor), a temperature sensor 64 (second temperature sensor), and a valve 65 (fifth valve). The tank 62 provides an internal space. The pressure sensor 63 is configured to measure a pressure in the internal space of the tank 62. The temperature sensor 64 is configured to measure a temperature in the internal space of the tank 62. The valve 65 is connected to the tank 62. The valve 65 is connected between the fourth valve 54 and the internal space of the tank 62 when the reference device 60 is connected to the tenth end 44c of the fourth gas flow channel 44.

The reference pressure sensor 70 can be connected to the tank 62. In an embodiment, the reference device 60 may further include a valve 66. The reference pressure sensor 70 may be connected to the internal space of the tank 62 through the valve 66. The reference pressure sensor 70 is configured to measure a pressure in the internal space of the tank 62 when the reference pressure sensor is connected to the internal space of the tank 62.

In an embodiment, the substrate processing system 10 may further include a main control unit MU. The main control unit MU may be a computer device including a processor such as a CPU, a storage device such as a memory, an input device such as a keyboard, a display device, and the like. The main control unit MU executes a control program stored in the storage device by the processor, and controls each unit of the substrate processing system 10 and each unit of the flow rate measurement system 40 in accordance with recipe data stored in the storage device. The method MT may be performed by controlling each unit of the substrate processing system 10 and each unit of the flow rate measurement system 40 by the main control unit MU.

Hereinafter, reference is made to FIG. 1 again to describe the method MT. In the following description, the method MT will be described using a case where a flow rate of a gas output from one flow rate controller $18_j$ of one gas supply unit $14_i$ is measured as an example. During the execution of the method MT, the valves 22 of the plurality of gas supply units 14 other than the gas supply unit $14_i$ are closed. In addition, valves other than one valve among the plurality of valves 58 are closed. In the following description, it is assumed that valves other than the valve $58_i$ among the plurality of valves 58 are closed. Further, the plurality of primary valves 19 and the plurality of secondary valves 20 connected to the plurality of flow rate controllers 18 other than the flow rate controller $18_j$ of one gas supply unit $14_i$ are closed.

The method MT includes steps ST1 to ST15. In an embodiment, the method MT may further include step STA in addition to steps ST1 to ST15. In an embodiment, the method MT may further include step STB.

Figure 4:
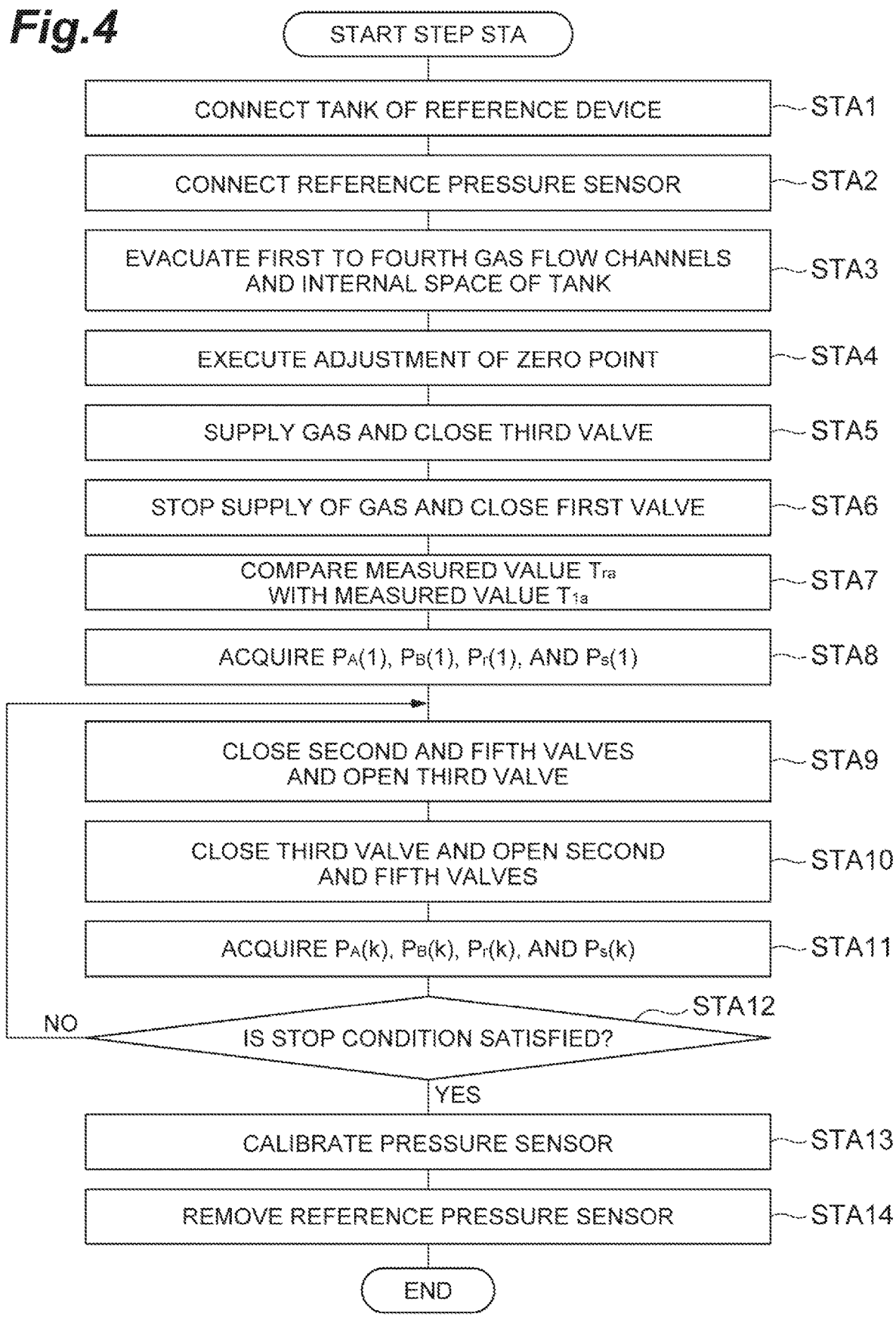
FIG. 4 is a flow diagram illustrating the detail of step STA of the method shown in FIG. 1.

In step STA, calibration of the pressure sensor 47, the pressure sensor 48, the pressure sensor 63, the temperature sensor 49, and the temperature sensor 64 is performed. FIG. 4 is a flow diagram illustrating the detail of step STA of the method illustrated in FIG. 1. As shown in FIG. 4, step STA includes steps STA1 to STA14.

In step STA1, the tank 62 of the reference device 60 is connected to the tenth end 44c of the fourth gas flow channel 44. Specifically, the valve 65 of the reference device 60 is connected to the tenth end 44c of the fourth gas flow channel 44. In the subsequent step STA2, the reference pressure sensor 70 is connected to the internal space of the tank 62 of the reference device 60. Specifically, the reference pressure sensor 70 is connected to the valve 66.

In the subsequent step STA3, the first gas flow channel 21, the second gas flow channel 42, the third gas flow channel 43, the fourth gas flow channel 44, and the internal space of the tank 62 are evacuated. In step STA3, a primary valve $19_j$ connected to the flow rate controller $18_j$ of the gas supply unit $14_i$ is closed, and a secondary valve $20_j$ connected to the flow rate controller $18_j$ of the gas supply unit $14_i$ is opened. Further, in step STA3, the valve 22 of the gas supply unit $14_i$, the first valve 51, the second valve 52, the third valve 53, the fourth valve 54, the valve 65, the valve 66, and the valve $58_i$ are opened. As a result, in step STA3, the first gas flow channel 21, the second gas flow channel 42, the third gas flow channel 43, the fourth gas flow channel 44, and the internal space of the tank 62 are connected to the exhaust apparatus $16_i$ and evacuated.

In the subsequent step STA4, a zero point of a measured value of each of the pressure sensor 47, the pressure sensor 48, and the pressure sensor 63 is adjusted in a state where the first gas flow channel 21, the second gas flow channel 42, the third gas flow channel 43, the fourth gas flow channel 44, and the internal space of the tank 62 are evacuated. That is, in step STA4, each of the pressure sensor 47, the pressure sensor 48, and the pressure sensor 63 is calibrated so that the measured value thereof indicates zero.

In the subsequent step STA5, the primary valve $19_j$ connected to the flow rate controller $18_j$ of the gas supply unit $14_i$ is opened, and the third valve 53 is closed in a state where a gas is output from the flow rate controller $18_j$. In the subsequent step STA6, the supply of a gas from the flow rate controller $18_j$ of the gas supply unit $14_i$ is stopped, and the first valve 51 is closed. A standby state continues until a measured value of the reference pressure sensor 70 is stabilized and a measured value of the temperature sensor 64 is stabilized. It is determined that the measured value of the reference pressure sensor 70 is stabilized in a case where the amount of fluctuation thereof is equal to or less than a predetermined value. In addition, it is determined that the measured value of the temperature sensor 64 is stabilized in a case where the amount of fluctuation thereof is equal to or less than a predetermined value.

In step STA6, when the measured value of the reference pressure sensor 70 is stabilized and the measured value of the temperature sensor 64 is stabilized, a state where a gas is confined in the third gas flow channel 43, the fourth gas flow channel 44, and the internal space of the tank 62 which communicate with each other so that a pressure in the third gas flow channel 43, a pressure in the fourth gas flow channel 44, and a pressure in the internal space of the tank 62 are set to be the same pressure is formed. In such a state, the subsequent step STA7 is executed. In step STA7, a measured value $T_{ra}$ of the temperature sensor 64 and a measured value $T_{1a}$ of the temperature sensor 49 are acquired, and the measured value $T_{ra}$ and the measured value $T_{1a}$ are compared with each other. Specifically, it is determined whether or not an absolute value of a difference between the measured value $T_{ra}$ and the measured value $T_{1a}$ falls within a predetermined allowable range. For example, it is determined whether or not a relation of $|T_{1a}-T_{ra}|<T_{THa}$ is satisfied. Here, $T_{THa}$ is a numerical value which defines the predetermined allowable range. In a case where the absolute value of the difference between the measured value $T_{ra}$ and the measured value $T_{1a}$ does not fall within the predetermined allowable range, the temperature sensor 49 is calibrated or replaced.

In the subsequent step STAB, a measured value group is acquired in the above-described state formed in step STA6. The measured value group acquired in step STA8 includes a measured value $P_A(1)$ of the pressure sensor 47, a measured value $P_B(1)$ of the pressure sensor 48, a measured value $P_r(1)$ of the pressure sensor 63, and a measured value $P_S(1)$ of the reference pressure sensor 70.

In the subsequent step STA9, the second valve 52 and the valve 65 are closed, and the third valve 53 is opened. A gas in the fourth gas flow channel 44 is at least partially discharged by the execution of step STA9. In the subsequent step STA10, the third valve 53 is closed, and the second valve 52 and the valve 65 are opened. Gases in the third gas flow channel 43 and the internal space of the tank 62 diffuse in the third gas flow channel 43, the fourth gas flow channel 44, and the internal space of the tank 62 by the execution of step STA10. A standby state continues until the measured value of the reference pressure sensor 70 is stabilized. It is determined that the measured value of the reference pressure sensor 70 is stabilized in a case where the amount of fluctuation is equal to or less than a predetermined value.

In a case where it is determined in step STA10 that the measured value of the reference pressure sensor 70 is stabilized, a state where a gas is confined in the third gas flow channel 43, the fourth gas flow channel 44, and the internal space of the tank 62 which communicate with each other so that a pressure in the third gas flow channel 43, a pressure in the fourth gas flow channel 44, and a pressure in the internal space of the tank 62 are set to be the same pressure is formed. In such a state, the subsequent step STA11 is executed. In step STA11, a measured value group is acquired. The measured value group acquired in step STA11 includes a measured value $P_A(k)$ of the pressure sensor 47, a measured value $P_B(k)$ of the pressure sensor 48, a measured value $P_r(k)$ of the pressure sensor 63, and a measured value $P_S(k)$ of the reference pressure sensor 70. Here, k denotes a numerical value indicating the order of a cycle to be described later, and is an integer equal to or greater than 1.

In the subsequent step STA12, it is determined whether or not a stop condition is satisfied. It is determined in step STA12 that the stop condition is satisfied in a case where the number of times of the execution of a cycle including steps STA9 to STA11 reaches a predetermined number of times. In a case where it is determined in step STA12 that the stop condition is not satisfied, steps STA9 to STA11 are executed again. On the other hand, in a case where it is determined in step STA12 that the stop condition is satisfied, the process proceeds to step STA13.

In step STA, step STA8 and the repetition of step STA11 are executed as described above. A step of acquiring a measured value group is executed in each of a plurality of cycles by step STA8 and the repetition of step STA11. As a result, a plurality of measured value groups are acquired. In a k-th cycle among the plurality of cycles, a gas confined in the fourth gas flow channel 44 in a (k−1)-th cycle among the plurality of cycles is discharged, and gases confined in the third gas flow channel 43 and the internal space of the tank 62 in the (k−1)-th cycle are diffused to the fourth gas flow channel 44, so that a state where a gas is confined in the third gas flow channel 43, the fourth gas flow channel 44, and the internal space of the tank 62 is formed.

In step STA13, a pressure sensor identified from each of the plurality of measured value groups as a sensor among the pressure sensor 47, the pressure sensor 48, and the pressure sensor 63 which has acquired a measured value having an error that does not fall within a predetermined allowable range from the measured value of the reference pressure sensor 70 is calibrated. For example, in a case where a relation of $|P_A(k)-P_S(k)|<P_{TH}$ is not satisfied, it is determined that the measured value of the pressure sensor 47 has an error that does not fall within the predetermined allowable range from the measured value of the reference pressure sensor 70, and the pressure sensor 47 is calibrated. Further, in a case where a relation of $|P_B(k)-P_S(k)|<P_{TH}$ is not satisfied, it is determined that the measured value of the pressure sensor 48 has an error that does not fall within the predetermined allowable range from the measured value of the reference pressure sensor 70, and the pressure sensor 48 is calibrated. Further, in a case where a relation of $|P_r(k)-P_S(k)|<P_{TH}$ is not satisfied, it is determined that the measured value of the pressure sensor 63 has an error that does not fall within the predetermined allowable range from the measured value of the reference pressure sensor 70, and the pressure sensor 63 is calibrated. $P_{TH}$ is a numerical value which defines the predetermined allowable range.

In the subsequent step STA14, the reference pressure sensor 70 is removed. Specifically, the valve 66 is closed, and the reference pressure sensor 70 is removed from the valve 66.

According to such step STA, the pressure sensor 47, the pressure sensor 48, and the pressure sensor 63 are appropriately calibrated. As a result, the accuracy of calculation of a flow rate Q to be described later is improved.

Figure 5:
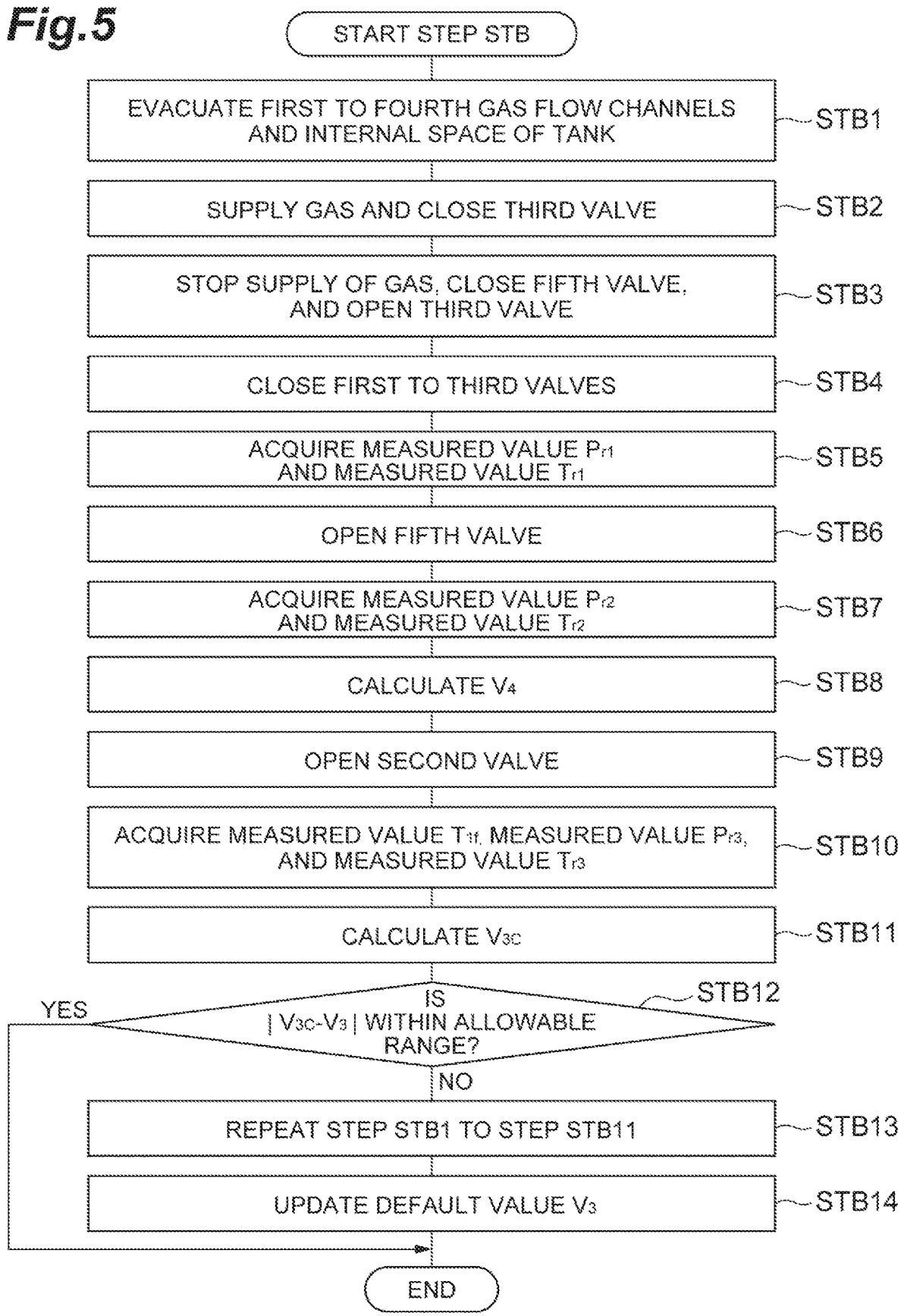
FIG. 5 is a flow diagram illustrating the detail of step STB of the method shown in FIG. 1.

As described above, in an embodiment, the method MT further includes step STB. In an embodiment, step STB is executed after step STA is executed. In step STB, the reliability of a default value $V_3$ is verified. The default value $V_3$ is the volume of the third gas flow channel 43, and is set in advance. FIG. 5 is a flow diagram illustrating the detail of step STB of the method illustrated in FIG. 1. As shown in FIG. 5, step STB includes steps STB1 to STB14.

In step STB1, the first gas flow channel 21, the second gas flow channel 42, the third gas flow channel 43, the fourth gas flow channel 44, and the internal space of the tank 62 are evacuated. In step STB1, the primary valve $19_j$ connected to the flow rate controller $18_j$ of the gas supply unit $14_i$ is closed, and the secondary valve $20_j$ connected to the flow rate controller $18_j$ of the gas supply unit $14_i$ is opened. Further, in step STB1, the valve 22 of the gas supply unit $14_i$, the first valve 51, the second valve 52, the third valve 53, the fourth valve 54, the valve 65, and the valve $58_i$ are opened, and the valve 66 is closed. As a result, in step STB1, the first gas flow channel 21, the second gas flow channel 42, the third gas flow channel 43, the fourth gas flow channel 44, and the internal space of the tank 62 are connected to the exhaust apparatus $16_i$ and evacuated.

In the subsequent step STB2, the primary valve $19_j$ connected to the flow rate controller $18_j$ of the gas supply unit $14_i$ is opened, and the third valve 53 is closed in a state where a gas is output from the flow rate controller $18_j$. A gas is confined in the first gas flow channel 21, the second gas flow channel 42, the third gas flow channel 43, the fourth gas flow channel 44, and the internal space of the tank 62 by the execution of step STB2.

In the subsequent step STB3, the supply of a gas from the flow rate controller $18_j$ of the gas supply unit $14_i$ is stopped, the valve 65 is closed, and the third valve 53 is opened. A state where a gas is confined in the internal space of the tank 62 is formed by the execution of step STB3. In addition, gases confined in the third gas flow channel 43 and the fourth gas flow channel 44 are discharged by the execution of step STB3.

In the subsequent step STB4, the first valve 51, the second valve 52, and the third valve 53 are closed. The fourth valve 54 remains open. In the subsequent step STB5, a measured value $P_{r1}$ of a pressure in the internal space of the tank 62 and a measured value $T_{r1}$ of temperature in the internal space of the tank 62 are acquired using the pressure sensor 63 and the temperature sensor 64 in a state where a gas is confined in the internal space of the tank 62.

In the subsequent step STB6, the valve 65 is opened. A standby state continues until a measured value of the pressure sensor 63 is stabilized. It is determined that the measured value of the pressure sensor 63 is stabilized in a case where the amount of fluctuation thereof is equal to or less than a predetermined value. In step STB6, when the measured value of the pressure sensor 63 is stabilized, a state where a gas confined in the internal space of the tank 62 is diffused in the internal space of the tank 62 and the fourth gas flow channel 44 is formed. In the subsequent step STB7, a measured value $P_{r2}$ of a pressure in the internal space of the tank 62 and a measured value $T_{r2}$ of temperature in the internal space of the tank 62 are acquired using the pressure sensor 63 and the temperature sensor 64, respectively, in the state formed in step STB6.

In the subsequent step STB8, a calculated value $V_4$ of the volume of the fourth gas flow channel 44 is determined. In step STB8, an arithmetic operation of the following Expression (2) is executed in order to determine the calculated value $V_4$. In the arithmetic operation of Expression (2), an already-known volume $V_r$ of the internal space of the tank 62, the measured value $P_{r1}$, the measured value $T_{r1}$, the measured value $P_{r2}$, and the measured value $T_{r2}$ are used.

$$V_4 = V_r \times (P_{r1}/T_{r1} - P_{r2}/T_{r2}) \times T_{r2}/P_{r2} \qquad (2)$$

In the subsequent step STB9, the second valve 52 is opened. A standby state continues until the measured value of the pressure sensor 63 is stabilized. It is determined that the measured value of the pressure sensor 63 is stabilized in a case where the amount of fluctuation there is equal to or less than a predetermined value. In step STB9, when the measured value of the pressure sensor 63 is stabilized, a state where gases diffused in the internal space of the tank 62 and the fourth gas flow channel 44 are diffused in the internal space of the tank 62, the third gas flow channel 43, and the fourth gas flow channel 44 is formed. In the subsequent step STB10, a measured value $T_{1f}$ of temperature in the third gas flow channel 43, a measured value $P_{r3}$ of a pressure in the internal space of the tank 62, and a measured value $T_{r3}$ of temperature in the internal space of the tank 62 are acquired using the temperature sensor 49, the pressure sensor 63, and the temperature sensor 64, respectively, in the state formed in step STB9.

In the subsequent step STB11, a calculated value $V_{3C}$ of the volume of the third gas flow channel 43 is determined.

In step STB11, an arithmetic operation of the following Expression (3) is executed in order to determine the calculated value $V_{3C}$. In the arithmetic operation of Expression (3), the already-known volume $V_r$ of the internal space of the tank 62, the measured value $P_{r1}$, the measured value $T_{r1}$, the calculated value $V_4$, the measured value $P_{r3}$, the measured value $T_{r3}$, and the measured value $T_{1f}$ are used.

$$V_{3C} = (V_r \times P_{r1}/T_{r1} - V_4 \times P_{r3}/T_{r3} - V_r \times P_{r3}/T_{r3}) \times T_{1f}/P_{r3} \qquad (3)$$

In the subsequent step STB12, it is determined whether or not an absolute value of a difference between the calculated value $V_{3C}$ and the default value $V_3$ falls within a predetermined allowable range. For example, it is determined whether or not a relation of $|V_{3C} - V_3| < V_{TH}$ is satisfied. In a case where the relation of $|V_{3C} - V_3| < V_{TH}$ is not satisfied, it is determined that the absolute value of the difference between the calculated value $V_{3C}$ and the default value $V_3$ does not fall within the predetermined allowable range. $V_{TH}$ is a numerical value which defines the predetermined allowable range. On the other hand, in a case where the relation of $|V_{3C} - V_3| < V_{TH}$ is satisfied, it is determined that the absolute value of the difference between the calculated value $V_{3C}$ and the default value $V_3$ falls within the predetermined allowable range.

In a case where it is determined in step STB12 that the absolute value of the difference between the calculated value $V_{3C}$ and the default value $V_3$ does not fall within the predetermined allowable range, step S 1B13 is executed. In step STB13, steps STB1 to STB11 are repeatedly executed. As a result, a plurality of calculated values $V_{3C}$ are acquired. In the subsequent step STB14, the default value $V_3$ is updated using an average value of the plurality of calculated values $V_{3C}$. That is, the default value $V_3$ is replaced with the average value of the plurality of calculated values $V_{3C}$.

After the execution of step STB14 or in a case where it is determined in step STB12 that the absolute value of the difference between the calculated value $V_{3C}$ and the default value $V_3$ falls within the predetermined allowable range, the execution of step STB is terminated. The fourth valve 54 and the valve 65 may be closed before step STB is terminated, and then the reference device 60 may be removed from the tenth end 44c.

In such step STB, the calculated value $V_{3C}$ of the volume of the third gas flow channel 43 is acquired on the basis of the Boyle-Charles' law. The calculated value $V_{3C}$ and the default value $V_3$ are compared with each other, and thus the reliability of the default value $V_3$ is verified. Further, in step STB, the default value $V_3$ is updated using the average value of the plurality of calculated values $V_{3C}$, and thus the default value $V_3$ with high reliability is obtained. Accordingly, the accuracy of calculation of the flow rate Q to be described later is improved.

Figure 6:
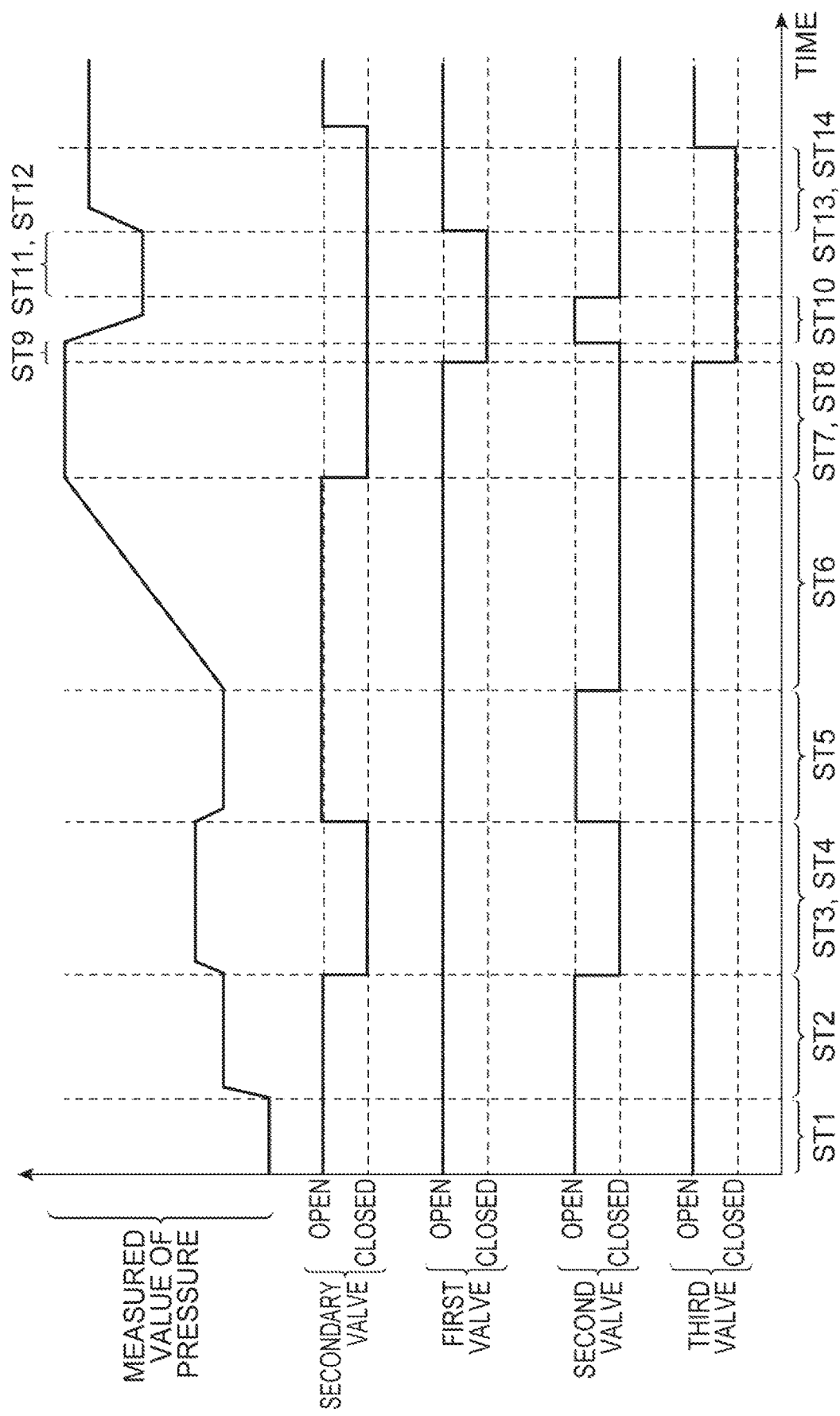
FIG. 6 is a timing diagram relating to the method shown in FIG. 1.

FIG. 1 will be referred to again. Further, in the following description, FIG. 6 will be referred to together with FIG. 1. FIG. 6 is a timing diagram relating to the method illustrated in FIG. 1. In the timing diagram of FIG. 6, the horizontal axis represents a time. In the timing diagram of FIG. 6, the vertical axis represents a measured value of the pressure of the third gas flow channel 43, an open/close state of the secondary valve $20_j$ connected to the flow rate controller $18_j$ of the gas supply unit $14_i$, an open/close state of the first valve 51, an open/close state of the second valve 52, and an open/close state of the third valve 53.

In step ST1 of the method MT, the first gas flow channel 21, the second gas flow channel 42, and the third gas flow channel 43 are evacuated. In step ST1, the fourth gas flow channel 44 is also evacuated. In step ST1, the primary valve $19_j$ connected to the flow rate controller $18_j$ of the gas supply unit $14_i$ is closed, and the secondary valve $20_j$ connected to the flow rate controller $18_j$ of the gas supply unit $14_i$ is opened. Further, in step ST1, the valve 22 of the gas supply unit $14_i$, the first valve 51, the second valve 52, the third valve 53, and the valve $58_i$ are opened. The fourth valve 54 is closed. As a result, in step ST1, the first gas flow channel 21, the second gas flow channel 42, the third gas flow channel 43, and the fourth gas flow channel 44 are connected to the exhaust apparatus $16_i$ and evacuated.

In the subsequent step ST2, the primary valve $19_j$ connected to the flow rate controller $18_j$ of the gas supply unit $14_i$ is opened, and the supply of a gas from the flow rate controller $18_j$ is started. In the subsequent step ST3, the secondary valve $20_j$ connected to the flow rate controller $18_j$ of the gas supply unit $14_i$ and the second valve 52 are closed. A first state where a gas output from the flow rate controller $18_j$ of the gas supply unit $14_i$ is confined between the secondary valve $20_j$ of the gas supply unit $14_i$ and the second valve 52, that is, in the first gas flow channel 21 of the gas supply unit $14_i$, the second gas flow channel 42, and the third gas flow channel 43 is formed by the execution of step ST3.

In the subsequent step ST4, a measured value $P_{11}$ of a pressure is acquired. The measured value $P_{11}$ is a measured value of a pressure in the third gas flow channel 43 in the first state. The measured value $P_{11}$ is a measured value acquired by the pressure sensor 47 or the pressure sensor 48. The measured value $P_{11}$ may be an average value between the measured value acquired by the pressure sensor 47 and the measured value acquired by the pressure sensor 48. In step ST4, the measured value $P_{11}$ may be acquired when the measured value acquired by the pressure sensor 47 and/or the pressure sensor 48 is stabilized. It is determined that the measured value acquired by the pressure sensor 47 and/or the pressure sensor 48 is stabilized in a case where the amount of fluctuation thereof is equal to or less than a predetermined value.

In the subsequent step ST5, the secondary valve $20_j$ connected to the flow rate controller $18_j$ of the gas supply unit $14_i$ and the second valve 52 are opened. In the subsequent step ST6, a pressure in the first gas flow channel 21 of the gas supply unit $14_i$, the second gas flow channel 42, and the third gas flow channel 43 is increased. Specifically, in step ST6, the second valve 52 is closed. That is, in step ST6, a second state where a gas is supplied to the first gas flow channel 21 of the gas supply unit $14_i$, the second gas flow channel 42, and the third gas flow channel 43 from the flow rate controller $18_j$ of the gas supply unit $14_i$, and the second valve 52 is closed is formed. In the second state, a pressure in the first gas flow channel 21 of the gas supply unit $14_i$, the second gas flow channel 42, and the third gas flow channel 43 rises.

In the subsequent step ST7, the secondary valve $20_1$ connected to the flow rate controller $18_j$ of the gas supply unit $14_i$ and the second valve 52 are closed. As a result of the execution of step ST7, a third state is formed.

In the subsequent step ST8, a measured value $P_{12}$ and a measured value $T_{12}$ are acquired. The measured value $P_{12}$ is a measured value of a pressure in the third gas flow channel 43 in the third state. The measured value $P_{12}$ is a measured value acquired by the pressure sensor 47 or the pressure sensor 48. The measured value $P_{12}$ may be an average value between the measured value acquired by the pressure sensor 47 and the measured value acquired by the pressure sensor 48. The measured value $T_{12}$ is a measured value of a temperature in the third gas flow channel 43 in the third state. The measured value $T_{12}$ is a measured value acquired by the temperature sensor 49. In step ST8, the measured value $P_{12}$ and the measured value $T_{12}$ may be acquired when the measured value acquired by the pressure sensor 47 and/or the pressure sensor 48 is stabilized and the measured value acquired by the temperature sensor 49 is stabilized. It is determined that the measured value acquired by the pressure sensor 47 and/or the pressure sensor 48 is stabilized in a case where the amount of fluctuation thereof is equal to or less than a predetermined value. In addition, it is determined that the measured value acquired by the temperature sensor 49 is stabilized in a case where the amount of fluctuation thereof is equal to or less than a predetermined value.

In the subsequent step ST9, the first valve 51 and the third valve 53 are closed. In the subsequent step ST10, the second valve 52 is opened. That is, in step ST10, the second valve 52 is opened and the first valve 51 is closed, so that a fourth state is formed from the third state. In the fourth state, a gas in the third gas flow channel 43 is at least partially discharged. In the fourth state according to an embodiment, the gas in the third gas flow channel 43 is partially discharged to the fourth gas flow channel 44. In the fourth state according to another embodiment, the gas in the third gas flow channel 43 may be completely discharged through the fourth gas flow channel 44.

In the subsequent step ST11, the second valve 52 is closed, so that a fifth state is formed from the fourth state. In an embodiment, the gas in the third gas flow channel 43 is partially discharged in the above-described fourth state, so that a pressure in the third gas flow channel 43 in the fifth state may be set to be higher than a pressure in the evacuated third gas flow channel 43. In this embodiment, the fifth state is formed by a gas confined in the third gas flow channel 43 being partially discharged in the third state, that is, without being completely discharged. Therefore, a time length required for forming the fifth state from the third state is shortened. In an embodiment, step 11a for opening the third valve 53 is added after step ST11 and steps ST9 to ST11a are repeated, so that a pressure in the third gas flow channel 43 may be reduced.

In the subsequent step ST12, a measured value $P_{13}$ of a pressure is acquired. The measured value $P_{13}$ is a measured value of a pressure in the third gas flow channel 43 in the fifth state. The measured value $P_{13}$ is a measured value acquired by the pressure sensor 47 or the pressure sensor 48. The measured value $P_{13}$ may be an average value between the measured value acquired by the pressure sensor 47 and the measured value acquired by the pressure sensor 48. In step ST12, the measured value $P_{13}$ may be acquired when the measured value acquired by the pressure sensor 47 and/or the pressure sensor 48 is stabilized. It is determined that the measured value acquired by the pressure sensor 47 and/or the pressure sensor 48 is stabilized in a case where the amount of fluctuation thereof is equal to or less than a predetermined value.

In the subsequent step ST13, the first valve 51 is opened, so that a sixth state is formed from the fifth state. In the subsequent step ST14, a measured value $P_{14}$ of pressure is acquired. The measured value $P_{14}$ is a measured value of a pressure in the third gas flow channel 43 in the sixth state. The measured value $P_{14}$ is a measured value acquired by the pressure sensor 47 or the pressure sensor 48. The measured value $P_{14}$ may be an average value between the measured value acquired by the pressure sensor 47 and the measured value acquired by the pressure sensor 48. In step ST14, the measured value $P_{14}$ may be acquired when the measured value acquired by the pressure sensor 47 and/or the pressure sensor 48 is stabilized. It is determined that the measured value acquired by the pressure sensor 47 and/or the pressure sensor 48 is stabilized in a case where the amount of fluctuation thereof is equal to or less than a predetermined value.

In the subsequent step ST15, the flow rate Q is determined. The flow rate Q is a flow rate of a gas output from the flow rate controller $18_j$ of the gas supply unit $14_1$ in the second state. In step ST15, an arithmetic operation of the following Expression (1) is executed in order to determine the flow rate Q.

$$Q=(P_{12}-P_{11})/\Delta t \times (1/R) \times (V/T) \quad (1)$$

In Expression (1), $\Delta t$ denotes a time length of an execution period of step ST6, R denotes a gas constant, and (V/T) includes $\{V_3/T_{12} \times (P_{12}-P_{13})/(P_{12}-P_{14})\}$.

In an embodiment, a specific arithmetic operation of step ST15 is an arithmetic operation of the following Expression (1a).

$$Q=(P_{12}-P_{11})/\Delta t \times (1/R) \times \{V_{st}/T_{st}+V_3/T_{12} \times (P_{12}-P_{13})/(P_{12}-P_{14})\} \quad (1a)$$

In Expression (1a), $V_{st}$ denotes the volume of a flow channel between an orifice member of the flow rate controller $18_j$ of the gas supply unit $14_i$ and the valve of the secondary valve $20_j$, and is a design value which is set in advance. $T_{st}$ denotes a temperature in the flow channel between the orifice member of the flow rate controller $18_j$ of the gas supply unit $14_i$ and the valve of the secondary valve $20_j$, and is acquired by a temperature sensor of the flow rate controller $18_j$. $T_{st}$ may be a temperature to be acquired in the third state. In Expression (1a), ($V_{st}/T_{st}$) may be omitted.

In the method MT, a pressure rise is caused by supplying a gas from one flow rate controller $18_j$ of one gas supply unit $14_i$ to the first gas flow channel 21 of the gas supply unit $14_i$, the second gas flow channel 42, and the third gas flow channel 43 in a state where the second valve 52 is closed. The rate of this pressure rise, that is, the rate of rise in pressure is used in Expression (1), so that a flow rate of a gas output from the flow rate controller $18_j$ is determined. In Expression (1), V/T should include a sum of ($V_E/T_E$) and ($V_3/T_{12}$). That is, the arithmetic operation of Expression (1) should be the following Expression (1b).

$$Q=(P_{12}-P_{11})\Delta t \times (1/R) \times (V_{st}/T_{st}+V_E/T_E+V_3/T_{12}) \quad (1b)$$

Here, $V_E$ denotes the sum of the volume of the first gas flow channel 21 of the gas supply unit $14_i$ and the volume of the second gas flow channel 42, and $T_E$ denotes temperature in the first gas flow channel 21 of the gas supply unit $14_i$ and the second gas flow channel 42 in the third state.

Here, the following Expression (4) is established from the Boyle-Charles law.

$$P_{12} \times V_E/T_E+P_{13} \times V_3/T_{12}=P_{14} \times V_E/T_E+P_{14} \times V_3/T_{12} \quad (4)$$

From Expression (4), the sum of ($V_E/T_E$) and ($V_3/T_{12}$) is represented as shown in the following Expression (5).

$$V_E/T_E+V_3/T_{12}=V_3/T_{12}+V_3/T_{12} \times (P_{14}-P_{13})/(P_{12}-P_{14})=V_3/T_{12} \times (P_{12}-P_{13})/(P_{12}-P_{14}) \quad (5)$$

Therefore, in Expression (1), $V_3/T_{12} \times (P_{12}-T_{13})/(P_{12}-P_{14})$ can be used instead of the sum of ($V_E/T_E$) and ($V_3/T_{12}$).

In the substrate processing system, since the first gas flow channel 21 is disposed inside the housing 17, a temperature in the first gas flow channel 21 is less influenced by the surrounding environment. In addition, since the third gas flow channel 43 is connected to the first gas flow channel 21 through the second gas flow channel 42, the third gas flow channel may be disposed in a region away from the plurality of chamber bodies 12. Therefore, a temperature in the third gas flow channel 43 is less influenced by the plurality of chamber bodies 12. On the other hand, the second gas flow channel 42 may be influenced by the surrounding environment, for example, the temperature of any of the plurality of chamber bodies 12. In the method MT, $V_3/T_{12} \times (P_{12}-P_{13})/(P_{12}-P_{14})$ is used in Expression (1) instead of the sum of ($V_E/T_E$) and ($V_3/T_{12}$). That is, in the method MT, it is possible to use a measured value acquired from a location which is not likely to be influenced by temperature from the surrounding environment in the calculation of the flow rate Q. Therefore, according to the method MT, it is possible to determine the flow rate Q with a high degree of accuracy.

Further, in the method MT, a sixth state is formed by diffusing gases confined in the first gas flow channel 21 and the second gas flow channel 42 in the third state to the third gas flow channel 43, and a measured value $P_{14}$ is acquired in the sixth state. That is, a gas used for forming a state during the acquisition of the measured value $P_{12}$ is reused for forming a state during the acquisition of the measured value $P_{14}$. Therefore, it is possible to efficiently determine the flow rate Q.

It should be noted that the flow rate Q may be determined for all of the flow rate controllers 18 of the gas supply unit $14_i$. In addition, the method MT may be executed in order for all of the plurality of gas supply units 14. In a case where the method MT is executed for the gas supply unit $14_{N+1}$, a pressure in each gas flow channel of a gas output from the flow rate controller $18_1$ of the gas supply unit $14_{N+1}$ is set to be a pressure lower than saturated vapor pressure of the gas. Meanwhile, the pressure of the gas which is set to be pressure lower than the saturated vapor pressure may be the pressure of a single gas in a case where a gas generated by the vaporization of liquid is used as a single gas. In a case where a mixed gas of the gas generated by the vaporization of liquid and another gas is used, the pressure of the gas which is set to be pressure lower than the saturated vapor pressure is partial pressure of the gas generated by the vaporization of liquid.

Hereinbefore, various embodiments are described. However, various modifications may be made without being limited to the above-described embodiments. For example, a substrate processing system in a modified embodiment may not include the gas supply unit $14_{N+1}$.

From the foregoing description, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of determining a flow rate of a gas in a substrate processing system using a flow rate measurement system,
   wherein the substrate processing system includes
   a plurality of chamber bodies,
   a plurality of gas supply units, each of which is configured to supply a gas to an internal space of a corresponding chamber body among the plurality of chamber bodies, each of the plurality of gas supply units having
   a housing,
   a plurality of flow rate controllers provided within the housing,
   a plurality of primary valves connected to primary sides of the plurality of flow rate controllers, respectively, a plurality of secondary valves connected to secondary sides of the plurality of flow rate controllers, respectively, and a first gas flow channel including a plurality of first ends, a second end, and a third end, the plurality of first ends being connected to the plurality of secondary valves, respectively, the plurality of first ends, the second end, and a portion extending from the plurality of first ends to the second end being provided within the housing, and the third end being provided outside the housing and connected to the internal space of the corresponding chamber body through an on/off valve, and a plurality of exhaust apparatuses connected to internal spaces of the plurality of chamber bodies through a plurality of exhaust flow channels, respectively, and wherein the flow rate measurement system includes a second gas flow channel including a plurality of fourth ends and a fifth end, each of the plurality of fourth ends being connected to the second end of a corresponding gas supply unit among the plurality of gas supply units, a third gas flow channel having a sixth end and a seventh end, a first valve connected between the fifth end of the second gas flow channel and the sixth end of the third gas flow channel, a second valve connected to the seventh end of the third gas flow channel, and provided to be capable of being connected to the plurality of exhaust apparatuses, one or more first pressure sensors configured to measure a pressure within the third gas flow channel, and a first temperature sensor configured to measure a temperature within the third gas flow channel, the method comprising:

evacuating the first gas flow channel, the second gas flow channel, and the third gas flow channel of one gas supply unit among the plurality of gas supply units;

acquiring a measured value $P_{11}$ of a pressure within the third gas flow channel using the one or more first pressure sensors, in a first state where a gas output from one flow rate controller among the plurality of flow rate controllers of the one gas supply unit is confined between the second valve and one secondary valve connected to a secondary side of the one flow rate controller among the plurality of secondary valves of the one gas supply unit, after said evacuating;

raising a pressure in the first gas flow channel, the second gas flow channel, and the third gas flow channel by forming a second state where a gas is supplied from the one flow rate controller to the first gas flow channel, the second gas flow channel, and the third gas flow channel, and the second valve is closed, after said acquiring a measured value $P_{11}$;

forming a third state where the second valve and the one secondary valve are closed, after said raising a pressure;

acquiring a measured value $P_{12}$ of a pressure within the third gas flow channel and a measured value $T_{12}$ of a temperature within the third gas flow channel in the third state, using the one or more first pressure sensors and the first temperature sensor;

forming a fourth state where the second valve is opened and the first valve is closed, from the third state;

forming a fifth state where the second valve is closed, from the fourth state;

acquiring a measured value $P_{13}$ of a pressure within the third gas flow channel in the fifth state, using the one or more first pressure sensors;

forming a sixth state where the first valve is opened from the fifth state;

acquiring a measured value $P_{14}$ of a pressure within the third gas flow channel in the sixth state, using the one or more first pressure sensors; and determining a flow rate Q of the gas output from the one flow rate controller in the second state by executing an arithmetic operation of the following Expression (1), $$Q=(P_{12}-P_{11})/\Delta t \times (1/R) \times (V/T) \tag{1}$$

where, in the Expression (1), $\Delta t$ is a time length of an execution period of said raising a pressure, R is a gas constant, (V/T) includes $\{V_3/T_{12} \times (P_{12}-P_{13})/(P_{12}-P_{14})\}$, and $V_3$ is a default value of a volume of the third gas flow channel.

2. The method according to claim 1, wherein the pressure within the third gas flow channel in the fifth state is set to be higher than the pressure within the third gas flow channel which is evacuated.

3. The method according to claim 1, wherein the flow rate measurement system further includes a fourth gas flow channel having an eighth end, a ninth end, a tenth end, a first partial flow channel extending between the eighth end and the ninth end, and a second partial flow channel branching from the first partial flow channel to extend to the tenth end, the second valve being connected between the seventh end of the third gas flow channel and the eighth end of the fourth gas flow channel, a third valve connected between the ninth end of the fourth gas flow channel and each of the plurality of exhaust apparatuses, and a fourth valve provided on the second partial flow channel, the method further comprising:

connecting a tank of a reference device to the tenth end, the reference device having the tank, a second temperature sensor that measures a temperature in an internal space of the tank, a second pressure sensor that measures a pressure in the internal space of the tank, and a fifth valve connected between the fourth valve and the internal space of the tank;

acquiring a measured value $P_{r1}$ of the pressure in the internal space of the tank and a measured value $T_{r1}$ of the temperature in the internal space of the tank using the second pressure sensor and the second temperature sensor, respectively, in a state where a gas is confined in the internal space of the tank;

acquiring a measured value $P_{r2}$ of the pressure in the internal space of the tank and a measured value $T_{r2}$ of the temperature in the internal space of the tank using the second pressure sensor and the second temperature sensor, respectively, in a state where the gas confined in the internal space of the tank is diffused in the internal space of the tank and the fourth gas flow channel;

determining a calculated value $V_4$ of a volume of the fourth gas flow channel by executing an arithmetic operation of the following Expression (2) using an already-known volume $V_r$ of the internal space of the tank, the measured value $P_{r1}$, the measured value $T_{r1}$, the measured value $P_{r2}$, and the measured value $T_{r2}$;

$$V_4=V_r \times (P_{r1}/T_{r1}-P_{r2}/T_{r2}) \times T_{r2}/P_{r2} \tag{2}$$

acquiring a measured value $T_{1f}$ of a temperature within the third gas flow channel, a measured value $P_{r3}$ of a pressure of the internal space of the tank, and a measured value $T_{r3}$ of a temperature of the internal space of the tank using the first temperature sensor, the second pressure sensor, and the second temperature sensor, respectively, in a state where the gas diffused in the internal space of the tank and the fourth gas flow channel is diffused in the internal space of the tank, the third gas flow channel, and the fourth gas flow channel;

determining a calculated value $V_{3C}$ of a volume of the third gas flow channel by executing an arithmetic operation of the following Expression (3) using the already-known volume $V_r$ of the internal space of the tank, the measured value $P_{r1}$, the measured value $T_{r1}$, the calculated value $V_4$, the measured value $P_{r3}$, the measured value $T_{r3}$, and the measured value $T_{1f}$; and $$V_{3C}=(V_r \times P_{r1}/T_{r1} - V_4 \times P_{r3}/T_{r3} - V_r \times P_{r3}/T_{r3}) \times T_{1f}/P_{r3} \qquad (3)$$

comparing the calculated value $V_{3C}$ with the default value $V_3$.

4. The method according to claim 3, further comprising:
acquiring a plurality of calculated values $V_{3C}$ of a volume of the third gas flow channel by repeating said acquiring a measured value $P_{r1}$ of the pressure in the internal space of the tank and a measured value $T_{r1}$ of the temperature in the internal space of the tank, said acquiring a measured value $P_{r2}$ of the pressure in the internal space of the tank and a measured value $T_{r2}$ of the temperature in the internal space of the tank, said determining a calculated value $V_4$ of a volume of the fourth gas flow channel, said acquiring a measured value $T_{1f}$ of a temperature within the third gas flow channel, a measured value $P_{r3}$ of a pressure of the internal space of the tank, and a measured value $T_{r3}$ of a temperature of the internal space of the tank, and said determining a calculated value $V_{3C}$ of a volume of the third gas flow channel, in a case where an absolute value of a difference between the calculated value $V_{3C}$ and the default value $V_3$ is not included in a predetermined allowable range; and
updating the default value $V_3$ using an average value of the plurality of calculated values $V_{3C}$.

5. The method according to claim 3, further comprising:
connecting a reference pressure sensor to the tank;
adjusting a zero point of each measured value of the one or more first pressure sensors, the second pressure sensor, and the reference pressure sensor, in a state where the third gas flow channel, the fourth gas flow channel, and the internal space of the tank are evacuated; and
acquiring a measured value group including a measured value of each of the one or more first pressure sensors, a measured value of the second pressure sensor, and a measured value of the reference pressure sensor in a state where a gas is confined in the third gas flow channel, the fourth gas flow channel, and the internal space of the tank which communicate with each other so that a pressure in the third gas flow channel, a pressure in the fourth gas flow channel, and a pressure in the internal space of the tank are the same as each other,
wherein a plurality of measured value groups are acquired by said acquiring a measured value group being executed at each of a plurality of cycles,
at a k-th cycle among the plurality of cycles, the gas confined in the fourth gas flow channel at a (k−1)-th cycle among the plurality of cycles is discharged and the gas confined in the third gas flow channel and the internal space of the tank at the (k−1)-th cycle is diffused into the fourth gas flow channel, whereby the state in which the gas is confined in the third gas flow channel, the fourth gas flow channel, and the internal space of the tank is formed, where k is an integer equal to or greater than 2, and
the method further comprises calibrating a pressure sensor identified from each of the plurality of measured value groups as one which acquires a measured value having an error which is not included in a predetermined allowable range with respect to the measured value of the reference pressure sensor, among the one or more first pressure sensors and the second pressure sensor.

6. A method of determining a flow rate of a gas in a substrate processing system using a flow rate measurement system,
wherein the substrate processing system includes
a plurality of chamber bodies,
a plurality of gas supply units, each of which is configured to supply a gas to an internal space of a corresponding chamber body among the plurality of chamber bodies, each of the plurality of gas supply units having
a housing,
a plurality of flow rate controllers provided within the housing,
a plurality of primary valves connected to primary sides of the plurality of flow rate controllers, respectively,
a plurality of secondary valves connected to secondary sides of the plurality of flow rate controllers, respectively, and
a first gas flow channel including a plurality of first ends, a second end, and a third end, the plurality of first ends being connected to the plurality of secondary valves, respectively, the plurality of first ends, the second end, and a portion extending from the plurality of first ends to the second end being provided within the housing, and the third end being provided outside the housing and connected to the internal space of the corresponding chamber body through an on/off valve, and
a plurality of exhaust apparatuses connected to internal spaces of the plurality of chamber bodies through a plurality of exhaust flow channels, respectively, and
wherein the flow rate measurement system includes
a second gas flow channel including a plurality of fourth ends and a fifth end, each of the plurality of fourth ends being connected to the second end of a corresponding gas supply unit among the plurality of gas supply units,
a third gas flow channel having a sixth end and a seventh end,
a first valve connected between the fifth end of the second gas flow channel and the sixth end of the third gas flow channel,
a second valve connected to the seventh end of the third gas flow channel, and provided to be capable of being connected to the plurality of exhaust apparatuses,
a fourth gas flow channel having an eighth end, a ninth end, a tenth end, a first partial flow channel extending between the eighth end and the ninth end, and a second partial flow channel branching from the first partial flow channel to extend to the tenth end, the second valve being connected between the seventh end of the third gas flow channel and the eighth end of the fourth gas flow channel, a third valve connected between the ninth end of the fourth gas flow channel and each of the plurality of exhaust apparatuses, a fourth valve provided on the second partial flow channel, one or more first pressure sensors configured to measure a pressure within the third gas flow channel, and a first temperature sensor configured to measure a temperature within the third gas flow channel, the method comprising:

connecting a tank of a reference device to the tenth end, the reference device having the tank, a second temperature sensor that measures a temperature in an internal space of the tank, a second pressure sensor that measures a pressure in the internal space of the tank, and a fifth valve connected between the fourth valve and the internal space of the tank;

acquiring a measured value $P_{r1}$ of the pressure in the internal space of the tank and a measured value $T_{r1}$ of the temperature in the internal space of the tank using the second pressure sensor and the second temperature sensor, respectively, in a state where a gas is confined in the internal space of the tank;

acquiring a measured value $P_{r2}$ of the pressure in the internal space of the tank and a measured value $T_{r2}$ of the temperature in the internal space of the tank using the second pressure sensor and the second temperature sensor, respectively, in a state where the gas confined in the internal space of the tank is diffused in the internal space of the tank and the fourth gas flow channel;

determining a calculated value $V_4$ of a volume of the fourth gas flow channel by executing an arithmetic operation of the following Expression (E1) using an already-known volume $V_r$ of the internal space of the tank, the measured value $P_{r1}$, the measured value $T_{r1}$, the measured value $P_{r2}$, and the measured value $T_{r2}$;

$$V_4 = V_r \times (P_{r1}/T_{r1} - P_{r2}/T_{r2}) \times T_{r2}/P_{r2} \tag{E1}$$

acquiring a measured value $T_{1f}$ of a temperature within the third gas flow channel, a measured value $P_{r3}$ of a pressure of the internal space of the tank, and a measured value $T_{r3}$ of a temperature of the internal space of the tank using the first temperature sensor, the second pressure sensor, and the second temperature sensor, respectively, in a state where the gas diffused in the internal space of the tank and the fourth gas flow channel is diffused in the internal space of the tank, the third gas flow channel, and the fourth gas flow channel;

determining a calculated value $V_{3C}$ of a volume of the third gas flow channel by executing an arithmetic operation of the following Expression (E2) using the already-known volume $V_r$ of the internal space of the tank, the measured value $P_{r1}$, the measured value $T_{r1}$, the calculated value $V_4$, the measured value $P_{r3}$, the measured value $T_{r3}$, and the measured value $T_{1f}$;

$$V_{3C} = (V_r \times P_{r1}/T_{r1} - V_4 \times P_{r3}/T_{r3} - V_r \times P_{r3}/T_{r3}) \times T_{1f}/P_{r3} \tag{E2}$$

comparing the calculated value $V_{3C}$ with a default value $V_3$ of the volume of the third gas flow channel;

evacuating the first gas flow channel, the second gas flow channel, and the third gas flow channel of one gas supply unit among the plurality of gas supply units;

acquiring a measured value $P_{11}$ of a pressure within the third gas flow channel using the one or more first pressure sensors, in a first state where a gas output from one flow rate controller among the plurality of flow rate controllers of the one gas supply unit is confined between the second valve and one secondary valve connected to a secondary side of the one flow rate controller among the plurality of secondary valves of the one gas supply unit, after said evacuating;

raising a pressure in the first gas flow channel, the second gas flow channel, and the third gas flow channel by forming a second state where a gas is supplied from the one flow rate controller to the first gas flow channel, the second gas flow channel, and the third gas flow channel, and the second valve is closed, after said acquiring a measured value $P_{11}$;

forming a third state where the second valve and the one secondary valve are closed, after said raising a pressure;

acquiring a measured value $P_{12}$ of a pressure within the third gas flow channel and a measured value $T_{12}$ of a temperature within the third gas flow channel in the third state, using the one or more first pressure sensors and the first temperature sensor;

forming a fourth state where the second valve is opened and the first valve is closed, from the third state;

forming a fifth state where the second valve is closed, from the fourth state, wherein the pressure within the third gas flow channel in the fifth state is set to be higher than the pressure within the third gas flow channel which is evacuated;

acquiring a measured value $P_{13}$ of a pressure within the third gas flow channel in the fifth state, using the one or more first pressure sensors;

forming a sixth state where the first valve is opened from the fifth state;

acquiring a measured value $P_{14}$ of a pressure within the third gas flow channel in the sixth state, using the one or more first pressure sensors; and determining a flow rate Q of the gas output from the one flow rate controller in the second state by executing an arithmetic operation of the following Expression (E3), $$Q = (P_{12} - P_{11})/\Delta t \times (1/R) \times (V/T) \tag{E3}$$

where, in the Expression (E3), $\Delta t$ is a time length of an execution period of said raising a pressure, R is a gas constant, and (V/T) includes $\{V_3/T_{12} \times (P_{12} - P_{13})/(P_{12} - P_{14})\}$.

7. The method according to claim 6, further comprising:

acquiring a plurality of calculated values $V_{3C}$ of a volume of the third gas flow channel by repeating said acquiring a measured value $P_{r1}$ of the pressure in the internal space of the tank and a measured value $T_{r1}$ of the temperature in the internal space of the tank, said acquiring a measured value $P_{r2}$ of the pressure in the internal space of the tank and a measured value $T_{r2}$ of the temperature in the internal space of the tank, said determining a calculated value $V_4$ of a volume of the fourth gas flow channel, said acquiring a measured value $T_{1f}$ of a temperature within the third gas flow channel, a measured value $P_{r3}$ of a pressure of the internal space of the tank, and a measured value $T_{r3}$ of a temperature of the internal space of the tank, and said determining a calculated value $V_{3C}$ of a volume of the third gas flow channel, in a case where an absolute value of a difference between the calculated value $V_{3C}$ and the default value $V_3$ is not included in a predetermined allowable range; and updating the default value $V_3$ using an average value of the plurality of calculated values $V_{3C}$.

8. The method according to claim 6, further comprising:
connecting a reference pressure sensor to the tank;
adjusting a zero point of each measured value of the one or more first pressure sensors, the second pressure sensor, and the reference pressure sensor, in a state where the third gas flow channel, the fourth gas flow channel, and the internal space of the tank are evacuated; and
acquiring a measured value group including a measured value of each of the one or more first pressure sensors, a measured value of the second pressure sensor, and a measured value of the reference pressure sensor in a state where a gas is confined in the third gas flow channel, the fourth gas flow channel, and the internal space of the tank which communicate with each other so that a pressure in the third gas flow channel, a pressure in the fourth gas flow channel, and a pressure in the internal space of the tank are the same as each other,
wherein a plurality of measured value groups are acquired by said acquiring a measured value group being executed at each of a plurality of cycles,
at a k-th cycle among the plurality of cycles, the gas confined in the fourth gas flow channel at a (k−1)-th cycle among the plurality of cycles is discharged and the gas confined in the third gas flow channel and the internal space of the tank at the (k−1)-th cycle is diffused into the fourth gas flow channel, whereby the state in which the gas is confined in the third gas flow channel, the fourth gas flow channel, and the internal space of the tank is formed, where k is an integer equal to or greater than 2, and
the method further comprises calibrating a pressure sensor identified from each of the plurality of measured value groups as one which acquires a measured value having an error which is not included in a predetermined allowable range with respect to the measured value of the reference pressure sensor, among the one or more first pressure sensors and the second pressure sensor.

9. A method of determining a flow rate of a gas in a substrate processing system using a flow rate measurement system,
wherein the substrate processing system includes
a plurality of chamber bodies,
a plurality of gas supply units, each of which is configured to supply a gas to an internal space of a corresponding chamber body among the plurality of chamber bodies, each of the plurality of gas supply units having
a housing,
a plurality of flow rate controllers provided within the housing,
a plurality of primary valves connected to primary sides of the plurality of flow rate controllers, respectively,
a plurality of secondary valves connected to secondary sides of the plurality of flow rate controllers, respectively, and
a first gas flow channel including a plurality of first ends, a second end, and a third end, the plurality of first ends being connected to the plurality of secondary valves, respectively, the plurality of first ends, the second end, and a portion extending from the plurality of first ends to the second end being provided within the housing, and the third end being provided outside the housing and connected to the internal space of the corresponding chamber body through an on/off valve, and
a plurality of exhaust apparatuses connected to internal spaces of the plurality of chamber bodies through a plurality of exhaust flow channels, respectively, and
wherein the flow rate measurement system includes
a second gas flow channel including a plurality of fourth ends and a fifth end, each of the plurality of fourth ends being connected to the second end of a corresponding gas supply unit among the plurality of gas supply units,
a third gas flow channel having a sixth end and a seventh end,
a first valve connected between the fifth end of the second gas flow channel and the sixth end of the third gas flow channel,
a second valve connected to the seventh end of the third gas flow channel, and provided to be capable of being connected to the plurality of exhaust apparatuses,
a fourth gas flow channel having an eighth end, a ninth end, a tenth end, a first partial flow channel extending between the eighth end and the ninth end, and a second partial flow channel branching from the first partial flow channel to extend to the tenth end, the second valve being connected between the seventh end of the third gas flow channel and the eighth end of the fourth gas flow channel,
a third valve connected between the ninth end of the fourth gas flow channel and each of the plurality of exhaust apparatuses,
a fourth valve provided on the second partial flow channel,
one or more first pressure sensors configured to measure a pressure within the third gas flow channel, and
a first temperature sensor configured to measure a temperature within the third gas flow channel,
the method comprising:
connecting a tank of a reference device to the tenth end, the reference device having the tank, a second temperature sensor that measures a temperature in an internal space of the tank, a second pressure sensor that measures a pressure in the internal space of the tank, and a fifth valve connected between the fourth valve and the internal space of the tank;
connecting a reference pressure sensor to the tank;
adjusting a zero point of each measured value of the one or more first pressure sensors, the second pressure sensor, and the reference pressure sensor, in a state where the third gas flow channel, the fourth gas flow channel, and the internal space of the tank are evacuated;
acquiring a measured value group including a measured value of each of the one or more first pressure sensors, a measured value of the second pressure sensor, and a measured value of the reference pressure sensor in a state where a gas is confined in the third gas flow channel, the fourth gas flow channel, and the internal space of the tank which communicate with each other so that a pressure in the third gas flow channel, a pressure in the fourth gas flow channel, and a pressure in the internal space of the tank are the same as each other;
acquiring a plurality of measured value groups by executing said acquiring a measured value group at each of a plurality of cycles, wherein, at a k-th cycle among the plurality of cycles, the gas confined in the fourth gas flow channel at a (k−1)-th cycle among the plurality of cycles is discharged and the gas confined in the third gas flow channel and the internal space of the tank at the (k−1)-th cycle is diffused into the fourth gas flow channel, whereby the state in which the gas is confined in the third gas flow channel, the fourth gas flow channel, and the internal space of the tank is formed, where k is an integer equal to or greater than 2;

calibrating a pressure sensor identified from each of the plurality of measured value groups as one which acquires a measured value having an error which is not included in a predetermined allowable range with respect to the measured value of the reference pressure sensor, among the one or more first pressure sensors and the second pressure sensor;

acquiring a measured value $P_{r1}$ of the pressure in the internal space of the tank and a measured value $T_{r1}$ of the temperature in the internal space of the tank using the second pressure sensor and the second temperature sensor, respectively, in a state where a gas is confined in the internal space of the tank;

acquiring a measured value $P_{r2}$ of the pressure in the internal space of the tank and a measured value $T_{r2}$ of the temperature in the internal space of the tank using the second pressure sensor and the second temperature sensor, respectively, in a state where the gas confined in the internal space of the tank is diffused in the internal space of the tank and the fourth gas flow channel;

determining a calculated value $V_4$ of a volume of the fourth gas flow channel by executing an arithmetic operation of the following Expression (E1) using an already-known volume $V_r$ of the internal space of the tank, the measured value $P_{r1}$, the measured value $T_{r1}$, the measured value $P_{r2}$, and the measured value $T_{r2}$;

$$V_4 = V_r \times (P_{r1}/T_{r1} - P_{r2}/T_{r2}) \times T_{r2}/P_{r2} \qquad (E1)$$

acquiring a measured value $T_{1f}$ of a temperature within the third gas flow channel, a measured value $P_{r3}$ of a pressure of the internal space of the tank, and a measured value $T_{r3}$ of a temperature of the internal space of the tank using the first temperature sensor, the second pressure sensor, and the second temperature sensor, respectively, in a state where the gas diffused in the internal space of the tank and the fourth gas flow channel is diffused in the internal space of the tank, the third gas flow channel, and the fourth gas flow channel;

determining a calculated value $V_{3C}$ of a volume of the third gas flow channel by executing an arithmetic operation of the following Expression (E2) using the already-known volume $V_r$ of the internal space of the tank, the measured value $P_{r1}$, the measured value $T_{r1}$, the calculated value $V_4$, the measured value $P_{r3}$, the measured value $T_{r3}$, and the measured value $T_{1f}$;

$$V_{3C} = (V_r \times P_{r1}/T_{r1} - V_4 \times P_{r3}/T_{r3} - V_r \times P_{r3}/T_{r3}) \times T_{1f}/P_{r3} \qquad (E2)$$

comparing the calculated value $V_{3C}$ with a default value $V_3$ of the volume of the third gas flow channel;

acquiring a plurality of calculated values $V_{3C}$ of a volume of the third gas flow channel by repeating said acquiring a measured value $P_{r1}$ of the pressure in the internal space of the tank and a measured value $T_{r1}$ of the temperature in the internal space of the tank, said acquiring a measured value $P_{r2}$ of the pressure in the internal space of the tank and a measured value $T_{r2}$ of the temperature in the internal space of the tank, said determining a calculated value $V_4$ of a volume of the fourth gas flow channel, said acquiring a measured value $T_{1f}$ of a temperature within the third gas flow channel, a measured value $P_{r3}$ of a pressure of the internal space of the tank, and a measured value $T_{r3}$ of a temperature of the internal space of the tank, and said determining a calculated value $V_{3C}$ of a volume of the third gas flow channel, in a case where an absolute value of a difference between the calculated value $V_{3C}$ and the default value $V_3$ is not included in a predetermined allowable range;

updating the default value $V_3$ using an average value of the plurality of calculated values $V_{3C}$;

evacuating the first gas flow channel, the second gas flow channel, and the third gas flow channel of one gas supply unit among the plurality of gas supply units;

acquiring a measured value $P_{11}$ of a pressure within the third gas flow channel using the one or more first pressure sensors, in a first state where a gas output from one flow rate controller among the plurality of flow rate controllers of the one gas supply unit is confined between the second valve and one secondary valve connected to a secondary side of the one flow rate controller among the plurality of secondary valves of the one gas supply unit, after said evacuating;

raising a pressure in the first gas flow channel, the second gas flow channel, and the third gas flow channel by forming a second state where a gas is supplied from the one flow rate controller to the first gas flow channel, the second gas flow channel, and the third gas flow channel, and the second valve is closed, after said acquiring a measured value $P_{11}$;

forming a third state where the second valve and the one secondary valve are closed, after said raising a pressure;

acquiring a measured value $P_{12}$ of a pressure within the third gas flow channel and a measured value $T_{12}$ of a temperature within the third gas flow channel in the third state, using the one or more first pressure sensors and the first temperature sensor;

forming a fourth state where the second valve is opened and the first valve is closed, from the third state;

forming a fifth state where the second valve is closed, from the fourth state, wherein the pressure within the third gas flow channel in the fifth state is set to be higher than the pressure within the third gas flow channel which is evacuated;

acquiring a measured value $P_{13}$ of a pressure within the third gas flow channel in the fifth state, using the one or more first pressure sensors;

forming a sixth state where the first valve is opened from the fifth state;

acquiring a measured value $P_{14}$ of a pressure within the third gas flow channel in the sixth state, using the one or more first pressure sensors; and determining a flow rate Q of the gas output from the one flow rate controller in the second state by executing an arithmetic operation of the following Expression (E3), $$Q = (P_{12} - P_{11})/\Delta t \times (1/R) \times (V/T) \qquad (E3)$$

where, in the Expression (E3), $\Delta t$ is a time length of an execution period of said raising a pressure, R is a gas constant, and (V/T) includes $\{V_3/T_{12} \times (P_{12} - P_{13})/(P_{12} - P_{14})\}$.

* * * * *